(12) United States Patent
Sawahata et al.

(10) Patent No.: US 8,042,424 B2
(45) Date of Patent: Oct. 25, 2011

(54) SYSTEM FOR OPENING/CLOSING A ROOF PANEL AND A BRANCHED DRIVING CABLE TO BE USED FOR THE SYSTEM

(75) Inventors: Koji Sawahata, Hiroshima (JP); Shinya Matsui, Hiroshima (JP); Takashi Motohashi, Hiroshima (JP); Takuya Izumi, Hiroshima (JP)

(73) Assignee: Webasto AG (DE)

( * ) Notice: Subject to any disclaimer, the term of this patent is extended or adjusted under 35 U.S.C. 154(b) by 222 days.

(21) Appl. No.: 12/295,159

(22) PCT Filed: Mar. 28, 2007

(86) PCT No.: PCT/JP2007/056578
§ 371 (c)(1),
(2), (4) Date: Nov. 26, 2008

(87) PCT Pub. No.: WO2007/114138
PCT Pub. Date: Oct. 17, 2007

(65) Prior Publication Data
US 2010/0007178 A1 Jan. 14, 2010

(30) Foreign Application Priority Data
Mar. 28, 2006 (JP) .................................. 2006-088854

(51) Int. Cl.
*F16C 1/10* (2006.01)
(52) U.S. Cl. ................................ 74/471 R; 296/107.17
(58) Field of Classification Search ............... 74/500, 74/471 R; 296/107.17, 120.01, 197.09, 107.08, 296/223, 216.02, 216.03; 292/216
See application file for complete search history.

(56) References Cited

U.S. PATENT DOCUMENTS
5,889,341 A * 3/1999 Kilker .................... 310/12.02
(Continued)

FOREIGN PATENT DOCUMENTS
DE 101 16 710 A1 10/2002
(Continued)

OTHER PUBLICATIONS
International Search Report; PCT/JP2007/056578; Date Jul. 3, 2007.
(Continued)

*Primary Examiner* — Glenn Dayoan
*Assistant Examiner* — Pinel Romain
(74) *Attorney, Agent, or Firm* — Studebaker & Brackett PC; Donald R. Studebaker

(57) ABSTRACT

Reducing number of components in a case where a plurality of locking mechanism is being used. The system includes an input cable (84) driven when pulled by an electric motor (10) via a hook (81); a connecting member (110) rotatably connected to a vehicle body, an output end of the input cable (84) is connected thereto; and a branched driving cable (100) having a first driving cable (503), an input end of which is connected to the connecting member (110) while an output end of which is connected to a link restricting mechanism (500) for transmitting a pulling force of the input cable (84) to the link restricting mechanism (500), and second driving cable (514), an input end of which is connected to the connecting member (110) and an output end of which is connected to the stored state locking mechanism (510) for transmitting a pulling force of the input cable (84) to the stored state locking mechanism (510), wherein the link restricting mechanism (500) and the stored state locking mechanism (510) are driven by the electric motor (10) via the branched driving cable (100).

2 Claims, 14 Drawing Sheets

U.S. PATENT DOCUMENTS

| | | | |
|---|---|---|---|
| 5,927,442 A * | 7/1999 | Liao | 188/24.16 |
| 6,116,110 A * | 9/2000 | Maue et al. | 74/471 R |
| 2001/0030430 A1 * | 10/2001 | Roos | 292/216 |
| 2002/0171258 A1 | 11/2002 | Obendiek | |
| 2005/0236847 A1 * | 10/2005 | Taniyama | 292/216 |
| 2007/0170727 A1 * | 7/2007 | Kohlstrand et al. | 292/216 |
| 2007/0273160 A1 * | 11/2007 | Fujimatsu et al. | 292/216 |
| 2008/0012355 A1 * | 1/2008 | Fujimatsu et al. | 292/216 |

FOREIGN PATENT DOCUMENTS

| | | |
|---|---|---|
| JP | 2002-264657 A | 9/2002 |
| JP | 2002-264658 A | 9/2002 |
| JP | 2003-231418 A | 9/2003 |
| JP | 2005-022483 A | 1/2008 |
| WO | 03/086801 A1 | 10/2003 |
| WO | 2004/043723 A2 | 5/2004 |

OTHER PUBLICATIONS

The Extended European Search Report dated Jul. 28, 2010; Application No. / Patent No. 07740016.6-2423 / 2006140 PCT/US2007056578.

* cited by examiner

SYSTEM FOR OPENING/CLOSING A ROOF PANEL AND A BRANCHED DRIVING CABLE TO BE USED FOR THE SYSTEM

TECHNICAL FIELD

The present invention relates to a system for holding a roof panel supported by a vehicle body via a link mechanism and capable of operating opening, closing, and moving between a fully closed state where vehicle cabin space is closed and a stored state where the vehicle cabin space is opened and said roof panel is stored in a storage room located in rear side of the vehicle, at the fully closed state and stored state, and a branched driving cable to be used for the system.

BACKGROUND ART

According to conventional art, there is provided a vehicle with such a configuration that panel members such as a roof panel provided to a vehicle body are made openable, closable, and movable (see Patent Documents 1, 2). In the vehicle relating to Patent Document 1, a roof panel is supported by a vehicle body via a link mechanism and at the same time, the link mechanism is driven by an electric motor so as to allow opening and closing of the roof panel between fully closed state where vehicle cabin space is closed and stored state where vehicle cabin space is opened and the roof panel is stored in the trunk room.

For panel members such as roof panel automatically openable/closable as mentioned, there is a possibility that lifting of the roof panel occurs by aerodynamic force or vibrations during traveling in fully closed state or at stored state, and looseness is caused due to vibrations during traveling. Therefore, the roof panel should be reliably held to the vehicle body in fully closed state and stored state, and various locking mechanisms are required.

For example, in the vehicle relating to Patent Document 1, a roof locking mechanism for holding front edge portion of the roof panel to front header of vehicle body in fully closed state, where vehicle cabin space is closed by the roof panel, is provided. The roof panel is held in fully closed state by this roof locking mechanism which is driven by an electric motor via a connecting rod.

Further, a link locking mechanism for restricting the link mechanism connecting the roof panel and the vehicle body while the roof panel is in fully closed state is provided. In this way, improvement of holding rigidity of the roof panel in fully closed state is attempted by restricting the link mechanism. That is, the link locking mechanism indirectly holds the roof panel by restricting the link mechanism. This link locking mechanism is driven via a wire although driving mechanism is unknown.

Further, in a vehicle relating to Patent Document 2, a stored state locking mechanism which holds the roof panel in the storage room in stored state where the roof panel is stored in the storage room is provided. In this way, by holding the roof panel in stored state by the stored state locking mechanism, up/down looseness of the roof panel in the storage room at traveling is prevented. The stored state locking mechanism is driven by an electric motor via a connecting rod.

Patent Document 1: Japanese Unexamined Patent Publication No. 2002-264657
Patent Document 2: Japanese Unexamined Patent Publication No. 2002-264658

DISCLOSURE OF INVENTION

Problems that the Invention is to Solve

However, as mentioned previously, as the number of locking mechanisms required increases, the number of driving mechanism or transmission members such as driving cables for transmitting driving force to the locking mechanism increases. As a result, suppression of costs becomes difficult and ease of assembly is lowered.

The present invention has been developed in view of the above aspects, and an object of the present invention is to reduce the number of parts for cases where a plurality of locking mechanisms is used.

Means for Solving the Problems

The present invention is designed in such that a plurality of locking mechanisms is driven by one driving mechanism using a branched driving cable capable of obtaining two outputs from one input. Locking mechanisms which can function appropriately even if they are driven by one driving mechanism are selected as said plurality of locking mechanisms. Specifically, an object of a first invention is a system for opening/closing a roof panel which a roof panel supported by a vehicle body via a link mechanism and is capable of operating opening/closing movement between a fully closed state for closing a vehicle cabin space and a stored state in which the vehicle cabin space is opened and said roof panel is stored in a storage room located in rear side of the vehicle, a fully closed state locking mechanism for holding the roof panel when said roof panel is in fully closed state, and a stored state locking mechanism for holding the roof panel when said roof panel is in stored state. The first invention is further comprising a driving mechanism associated with a storage room panel adapted for opening and closing said storage room, a branched driving cable having an input cable being driven by said driving mechanism when pulled, a connecting member connected rotatably to the vehicle body with output end of the input cable is connected thereto, a first output cable, an input end of which is connected to the connecting member while an output end of which is connected to said fully closed state locking mechanism, which first output cable transmits a pulling force of the input cable to the fully closed state locking mechanism, and a second output cable, an input end of which is connected to the connecting member while an output end of which is connected to said stored state locking mechanism, which second output cable transmits a pulling force of the input cable to the stored state locking mechanism, where both of said fully closed state locking mechanism and said stored state locking mechanism are driven by said driving mechanism through said branched driving cable.

With said configuration, said fully closed locking mechanism and stored state locking mechanism can be driven by one input. Specifically, when said input cable is driven while the roof panel is in fully closed state, the fully closed state locking mechanism holds the roof panel. Although the stored state locking mechanism is operated on this occasion, it does not hold the roof panel since the roof panel is not in stored state. Meanwhile, when the input cable is driven while the roof panel is in stored state, the stored state locking mechanism holds the roof panel. Although the fully closed state locking mechanism is operated on this occasion, it does not hold the roof panel since the roof panel is not in fully closed state.

In other words, the fully closed state locking mechanism is a locking mechanism necessary when the roof panel is in fully closed state while the stored state locking mechanism is a locking mechanism necessary when the roof panel is in stored state, and fully closed state and stored state do not occur simultaneously, and therefore one input can drive fully closed state locking mechanism or stored state locking mechanism appropriately as necessary. In this way, fully closed state locking mechanism and stored state locking mechanism are driven via said branched driving cable, and common use of the driving mechanism is made possible.

Further, when the roof panel moves from stored state to fully closed state and from fully closed state to stored state, said storage room panel need to be opened/closed inevitably. That is, since said fully closed state locking mechanism and stored state locking mechanism function being interlocked with the storage room panel, such a configuration is used that said fully closed state locking mechanism and stored state locking mechanism are driven by a driving mechanism associated with the storage room panel. With this feature, the driving mechanism shared between the fully closed locking mechanism and the stored state locking mechanism by the branched driving cable is also used as a driving mechanism associated with the storage room panel, thereby reducing the number of parts.

In this way, since driving cables and driving mechanism can be made common, ease of assembly can be improved in addition to cost reduction through reduction in the number of parts.

In a second invention related to the first invention, said storage room panel is provided with a storage room panel locking mechanism for holding the storage room panel when said storage room is closed, said driving mechanism is adapted to drive said storage room panel locking mechanism, and said fully closed state locking mechanism and said stored state locking mechanism are driven synchronously so that both of said mechanisms hold said roof panel and said storage room panel when said storage room panel locking mechanism is holding said storage room panel, while both of said mechanisms release holding of said roof panel and said storage room panel when said storage room panel locking mechanism releases holding of said storage room panel.

With said configuration, said storage room panel is held in fully closed state by said storage room panel locking mechanism and is brought into fully opened state when the roof panel is moved from fully closed state to stored state or from stored state to fully closed state.

For the roof panel which is opened and closed as mentioned, time required for storing or fully closing the roof panel is preferably shorter. Then, in order to shorten the time required, such a configuration is employed that when said storage room panel locking mechanism releases holding of said storage room panel, said fully closed state locking mechanism and stored state locking mechanism release holding of the roof panel. Supposedly, if holding of the roof panel and holding of the storage room panel are released in separate timing, a panel holding of which is released first should start operation having waited for releasing of holding of rest panel, and time required for storing or fully closing the roof panel is lengthened as much as the time for waiting. However, with said configuration, holding of the storage room panel and holding of the roof panel are released nearly simultaneously, operating timing of the storage room panel and roof panel can be set with flexible manner without waiting for releasing of holding of other panel, such as the storage room panel and roof panel are actuated simultaneously. As a result, reduction in required time for storing or fully closing the roof panel can be reduced, thereby improving roof panel performance.

In a third invention related to the first or second invention, said first output cable is connected to said connecting member at a position away from a rotation center of said connecting member for a predetermined first distance, said second output cable is connected to said connecting member at a position away from the rotation center of said connecting member for a predetermined second distance, and said input cable is connected to said connecting member at a position away from the rotation center of said connecting member for a predetermined third distance.

With said configuration, by adjusting said predetermined first to third distances, a pulling force input to said input cable can be increased or decreased and then transmitted to the output cable, the output cable can be driven with stroke volume (pulling length) when the input cable is driven being increased or decreased. That is, by adjusting said predetermined first to third distances in said connecting member, pulling force or stroke volume being input can be adjusted depending on each locking mechanism and then output.

Meanwhile, said first to third distances need not necessarily be different, and the same distance may be used.

In a fourth invention is a branched driving cable is comprising an input cable driven by a pulling force, a rotatable connecting member connected to an output end of the input cable, a first output cable, an output end of which is connected to the connecting member while an input end of which is connected to a first member to be driven, and a second output cable, an output end of which is connected to the connecting member and input end is connected to a second member to be driven.

With said configuration, since input sides of the driving cables is made common and the driving cable is configured into split construction having one input cable (said input cable) and two output cables (said first output cable and second output cable), the driving cable for driving two driven members can be structured as one assembly. As a result, the number of parts of cables can be reduced, thereby suppressing the costs and improving ease of assembly.

In a fifth invention related to the forth invention, said first output cable is connected to said connecting member at a position away from a rotation center of the connecting member for a predetermined first distance, said second output cable is connected to said connecting member at a position away from the rotation center of the connecting member for a predetermined second distance, and said input cable is connected to said connecting member at a position away from the rotation center of the connecting member for a predetermined third distance.

With said configuration, by adjusting said predetermined first to third distances, a pulling force input to said input cable can be increased or decreased and then transmitted to the output cable, the output cable can be driven with stroke volume (pulling length) when the input cable is driven being increased or decreased. That is, by adjusting said predetermined first to third distances in said connecting member, pulling force or stroke volume being input can be adjusted depending on each locking mechanism and then output.

Meanwhile, said first to third distances need not necessarily be different, and the same distance may be used.

ADVANTAGES OF THE INVENTION

According to the present invention, said fully closed state locking mechanism and stored state locking mechanism are driven by said branched driving cable, and driving mechanism thereof is made common with the driving mechanism associated with said storage room panel to allow reduction in the number of parts, thereby suppressing costs and improving ease of assembly.

Further, according to another aspect of the present invention, a driving cable for driving said first driven means and second driven means is composed to be branched construction having one input cable and two output cables (i.e., first output cable and second output cable), and this allows reduction in the number of parts and suppression of costs. Thus, a plurality of cables in the conventional art can be put into one assembly, thereby improving ease of assembly.

Figure 1:
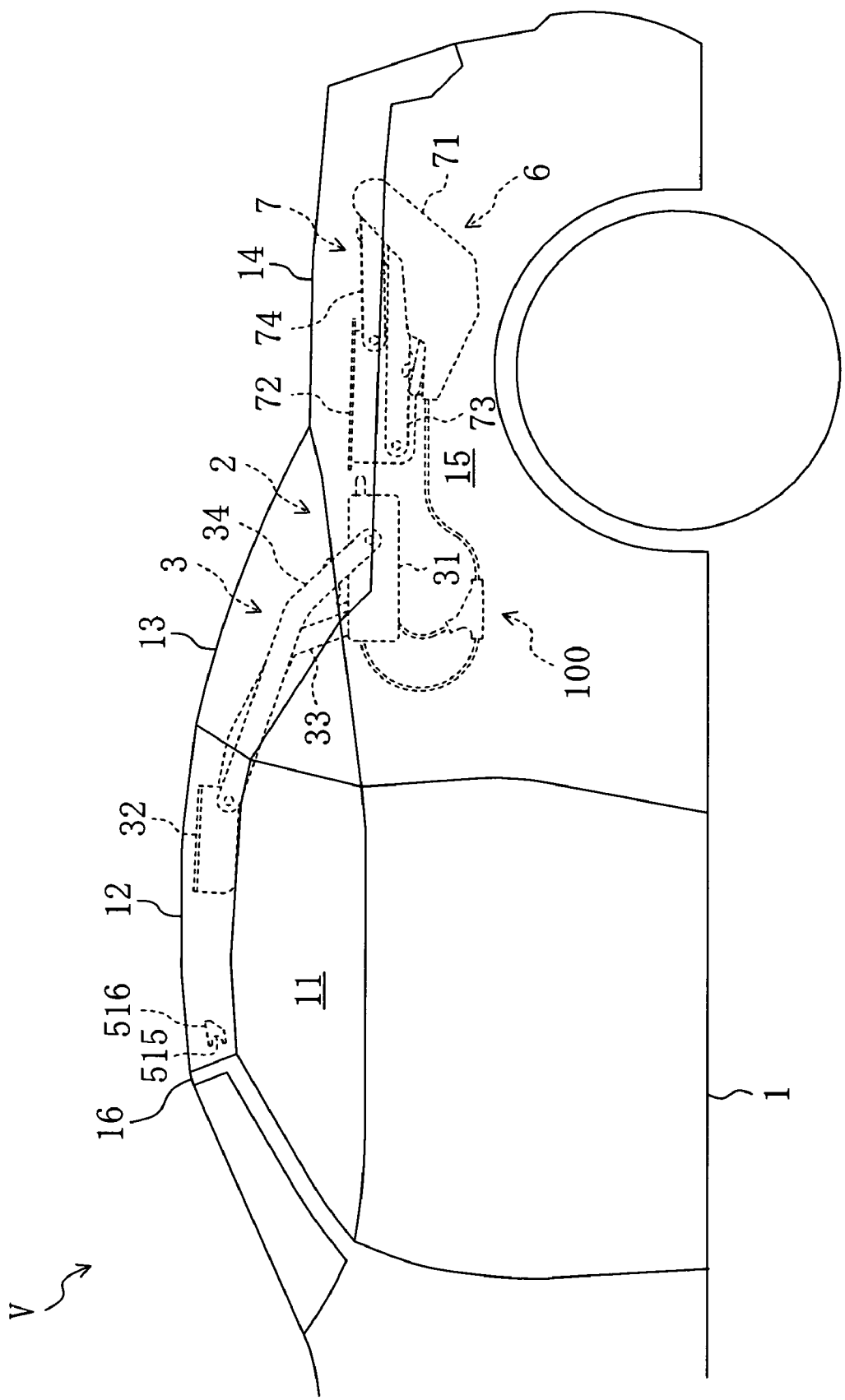
FIG. 1 is an outline side view showing a roof panel and trunk lid in fully closed state in a vehicle employing an opening/closing device of a panel member relating to embodiment of the present invention.

DESCRIPTION OF REFERENCE NUMERALS 1 vehicle body
10 electric motor (driving mechanism)
11 vehicle cabin space (predetermined space)
12 roof panel
14 trunk lid (storage room panel)
15 trunk room (storage room)
500 link restricting mechanism (fully closed state locking mechanism)
503 first driving cable (first output cable)
510 stored state locking mechanism
514 second driving cable (second output cable)
7 link mechanism
8 locking mechanism (storage room panel locking mechanism)
84 input cable
100 branched driving cable
110 connecting member
L1 first distance
L2 second distance
L3 third distance

BEST MODE FOR CARRYING OUT THE INVENTION

Referring now to the drawings, the embodiment of the present invention will be explained hereafter in detail.

For simplicity of explanation, in the explanation of the embodiment, front side of the vehicle is referred to as "front", rear side of the vehicle is referred to as "rear", left side of vehicle width direction is referred to as "left", and right side of vehicle width direction is referred to as "right".

FIG. 1 shows a vehicle V having a trunk lid relating to the embodiment of the present invention. Reference numeral 12 is a roof panel provided to a vehicle body 1, 13 is a back window panel provided to the vehicle 1, 14 is a trunk lid for opening/closing a trunk room 15 formed to rear side of the vehicle of vehicle body 1.

Figure 3:
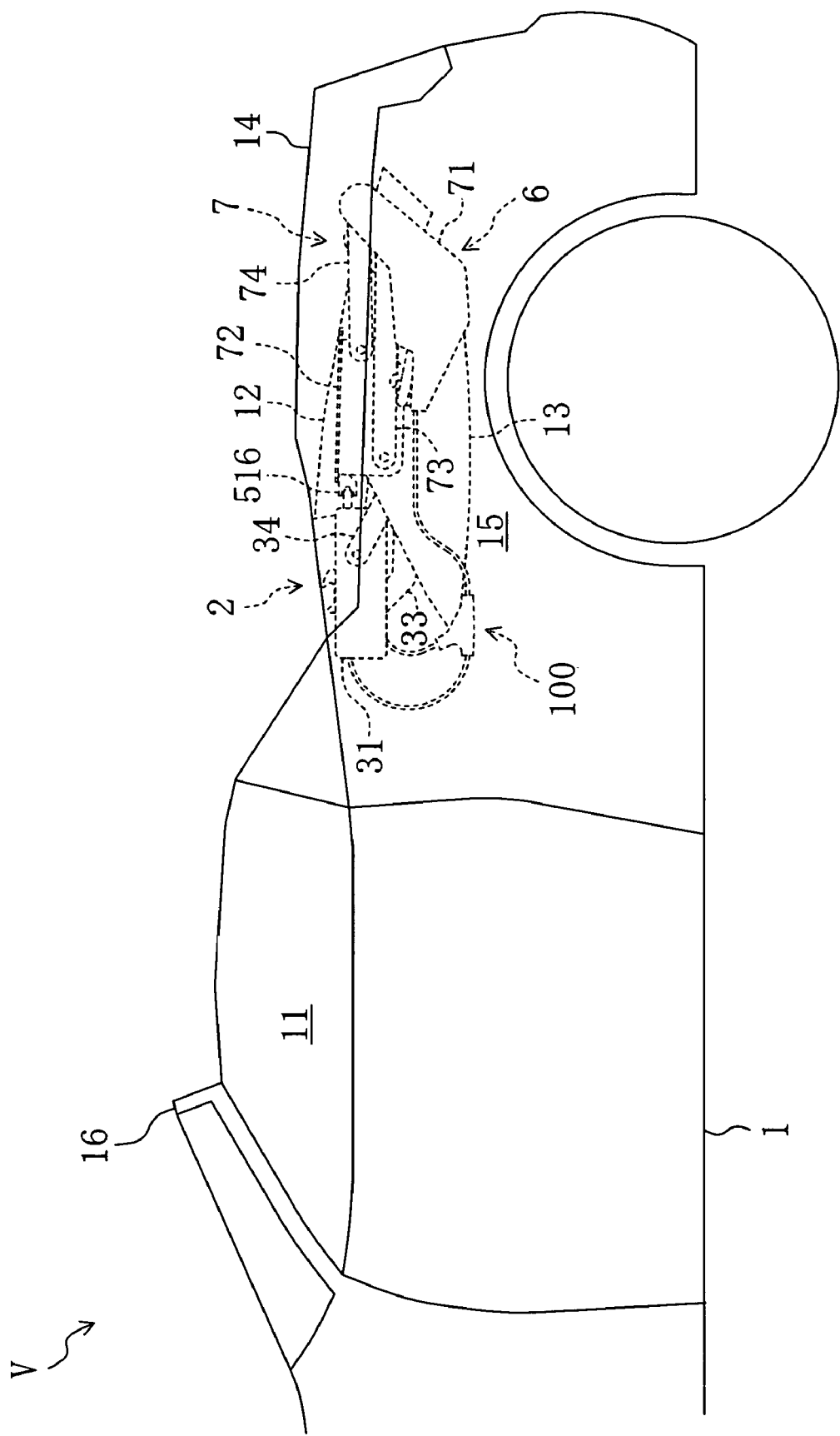
FIG. 3 is an outline side view showing a vehicle when the roof panel and trunk lid are in stored state.

Said roof panel 12 and back window panel 13 are configured to be openable/closable by the roof panel opening/closing device 2 between fully closed state where vehicle cabin space 11 of the vehicle body 1 is closed as shown in FIG. 1 and stored state (fully opened state) being in the trunk room 15 provided at rear side of the vehicle as shown in FIG. 3.

Further, said trunk lid 14 is configured to be openable/closable by the trunk lid opening/closing device 6 between fully closed state where the trunk room 15 is closed and fully opened state where the trunk room 15 is opened. The trunk lid 14 performs opening/closing operation being interlocked with opening/closing operation of said roof panel 12 and back window panel 13. That is, when said roof panel 12 and back window panel 13 are in fully closed state or stored state, the trunk lid 14 is in fully closed state (see FIGS. 1, 3), and when said roof panel 12 and back window panel 13 are performing opening/closing operation from fully closed state to stored state or vice versa, the trunk room 15 remains in opened state (see FIG. 2).

<Trunk Lid Opening/Closing Device>

First, the trunk lid opening/closing device 6 will be explained. Although the trunk lid opening/closing device 6 is provided at both right and left side with respect to the trunk lid 14, their configuration is identical, and therefore, explanation will be given for the trunk lid opening/closing device 6 at the left referring to FIG. 4 to FIG. 8.

The trunk lid opening/closing device 6 includes a link mechanism 7 for connecting the trunk lid 14 and the vehicle body 1, a locking mechanism 8 for holding the trunk lid 14 in fully closed state, an electric motor 10 (not shown in FIGS. 5 to 7) for driving the link mechanism 7 and the locking mechanism 8, and a transmitting mechanism 9 for transmitting a driving force of the electric motor 10 to the link mechanism 7, causes the trunk lid 14 to perform opening/closing operation between fully closed state and fully opened state, and at the same time, holds the trunk lid 14 to the vehicle body in fully closed state.

Said link mechanism 7 includes a base bracket 71 provided to the vehicle body 1, a lid side bracket 72 provided to the trunk lid 14, and a front connecting link 73 and a rear connecting link 74 for connecting the base bracket 71 and the lid side bracket 72.

Said base bracket 71 includes mounting brackets 71a, 71a, . . . , and these mounting brackets 71a, 71a, . . . are attached to the side body of the vehicle body 1 from the inside of the vehicle cabin.

Lid side end of said front connecting link 73 is rotatably connected to the lid side bracket 72 and vehicle side end of said front connecting link 73 is rotatably connected to the base bracket 71. Further, lid side end of said rear connecting link 74 is rotatably connected to the lid side bracket 72 and vehicle side end of said rear connecting link 74 is rotatably connected to the base bracket 71 at backward position than the front connecting link member 73.

In this way, the base bracket 71, the lid side bracket 72, the front connecting link member 73, and rear connecting link 74 constitute so-called four-jointed link mechanism, and rotation of the front connecting link 73 and the rear connecting link 74 about each of vehicle side end causes the trunk lid 14 to perform opening/closing operation.

Said transmitting mechanism 9 includes a driving link 91 one end of which is connected to said rear connecting link 74, a sector gear 92 rotatably driven being connected to the electric motor 10, and a connecting pin 93 for connecting other end of the driving link 91 and the sector gear 92, and is so composed that transmitting state where driving force of the electric motor 10 is transmitted to the link mechanism 7 and non-transmitting state where the driving force is not transmitted to the link mechanism 7 are switchable.

One end of said driving link 91 is rotatably connected to said rear connecting link 74 at a connection portion 91a, while to other end is penetrated an inserting hole 91b (see FIG. 8) through which said connecting pin 93 is passed.

To said sector gear 92 are integrally formed a gear portion 92a mating with an output gear (not shown) provided to an output shaft of said electric motor 10 and a connection portion 92b to which other end of said driving link 91 is connected. Said gear portion 92a has gear ratio to reduce driving force of the electric motor 10 with respect to the output gear, i.e., the sector gear 92 functions also as a reduction gear. To said connection portion 92b is penetrated a fitting hole 92c in oblong shape extending in radial direction with respect to center of rotation of the sector gear 92.

Then, by fitting the connecting pin 93 passed through the inserting hole 91b of said driving link 91 into the fitting hole 92c of said sector gear 92, the driving link 91 is rotatably connected to the sector gear 92 and is displaceably connected in the direction of extension of the oblong hole of the fitting hole 92c. Although the connecting pin 93 is rotatably provided to the driving link 91 by insertion through the inserting hole 91b of the driving link 91, the connecting pin 93 may be fixed to the driving link 91 by welding. Further, the fitting hole 92c need not be penetrated necessarily, and any configuration with closed bottom may be used as long as the connecting pin 93 can be fit thereto.

Figure 8:
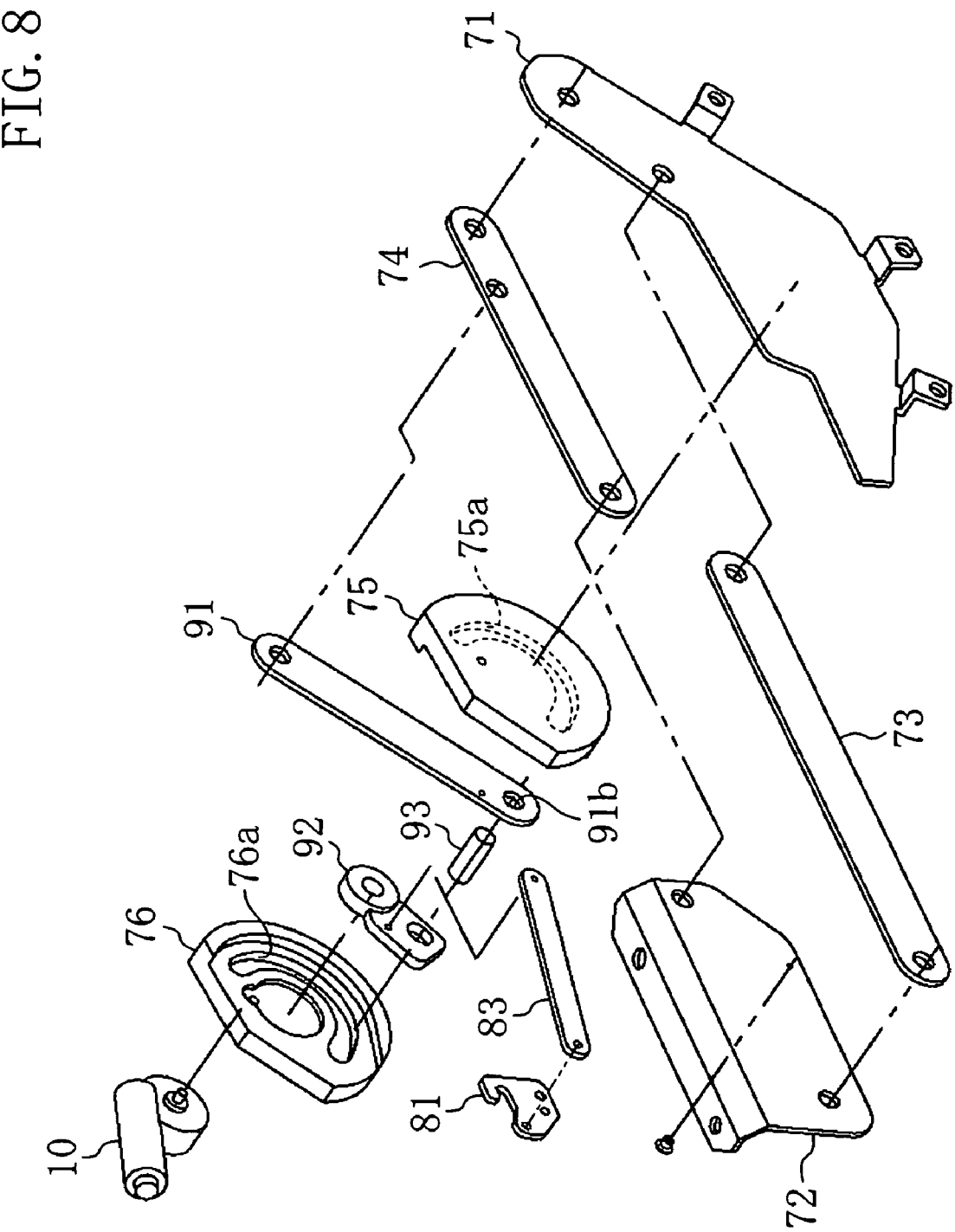
FIG. 8 is an exploded perspective view showing the trunk lid opening/closing device.

The driving link 91 and the sector gear 92 connected via the connecting pin 93 are grasped by a guide outer 75 (shown in FIG. 8 only) and a guide inner 76 (shown in FIG. 8 only) provided opposedly each other as shown in FIG. 8. When the guide outer 75 is provided to the base bracket 71, the driving link 91, the sector gear 92, the connecting pin 93 or the like are then provided to the base bracket 71.

Here, an outer guide groove 75a is formed to said guide outer 75, and at the same time, an inner guide groove 76a having identical profile of the outer guide groove 75a as opposed thereto is formed to the guide inner 76. A pair of the outer guide groove 75a and the inner guide groove 76a constitutes one guide portion 94. Meanwhile, the outer guide groove 75a and the inner guide groove 76a have a groove width which is identical to or slightly broader than the outside diameter of the connecting pin 93 and allows fitting of the connecting pin 93 in the groove 76a.

Specifically, when said driving link 91 and the sector gear 92 are grasped by the guide outer 75 and the guide inner 76, the sector gear 92 is rotatably supported with respect to the guide outer 75 and the guide inner 76 and at the same time, each of both ends of the connecting pin 93 penetrating through the driving link 91 and the sector gear 92 is engaged with the outer guide groove 75a and the inner guide groove 76a. Further, the electric motor 10 is mounted to the guide inner 76 so that an output gear of the output shaft thereof mates with the gear portion 92a of the sector gear 92. Meanwhile, to the connection portion 92b of the sector gear 92 is connected a lock transmitting link 83, which will be dealt with later, in addition to said driving link 91.

With the transmitting mechanism 9 thus composed, when the sector gear 92 is rotatably driven by the electric motor 10, the driving link 91 connected to the sector gear 92 by the connecting pin 93 is driven. On this occasion, since the connecting pin 93 is engaged with the guide portion 94, the driving link 91 is driven while the connecting pin 93 is being guided by the guide portion 94.

Profile of said guide portion 94 will be explained in detail. The guide portion 94 (outer guide groove 75a and inner guide groove 76a) has a curved shape from one end located at front lower side to other end located at rear upper side, and a non-transmitting guide portion 94a for not transmitting the driving force of the electric motor 10 to the link mechanism 7 and a transmitting guide portion 94b for transmitting the driving force of the electric motor 10 to the link mechanism 7 are continuous with each other at a switching point 94c.

Figure 4:
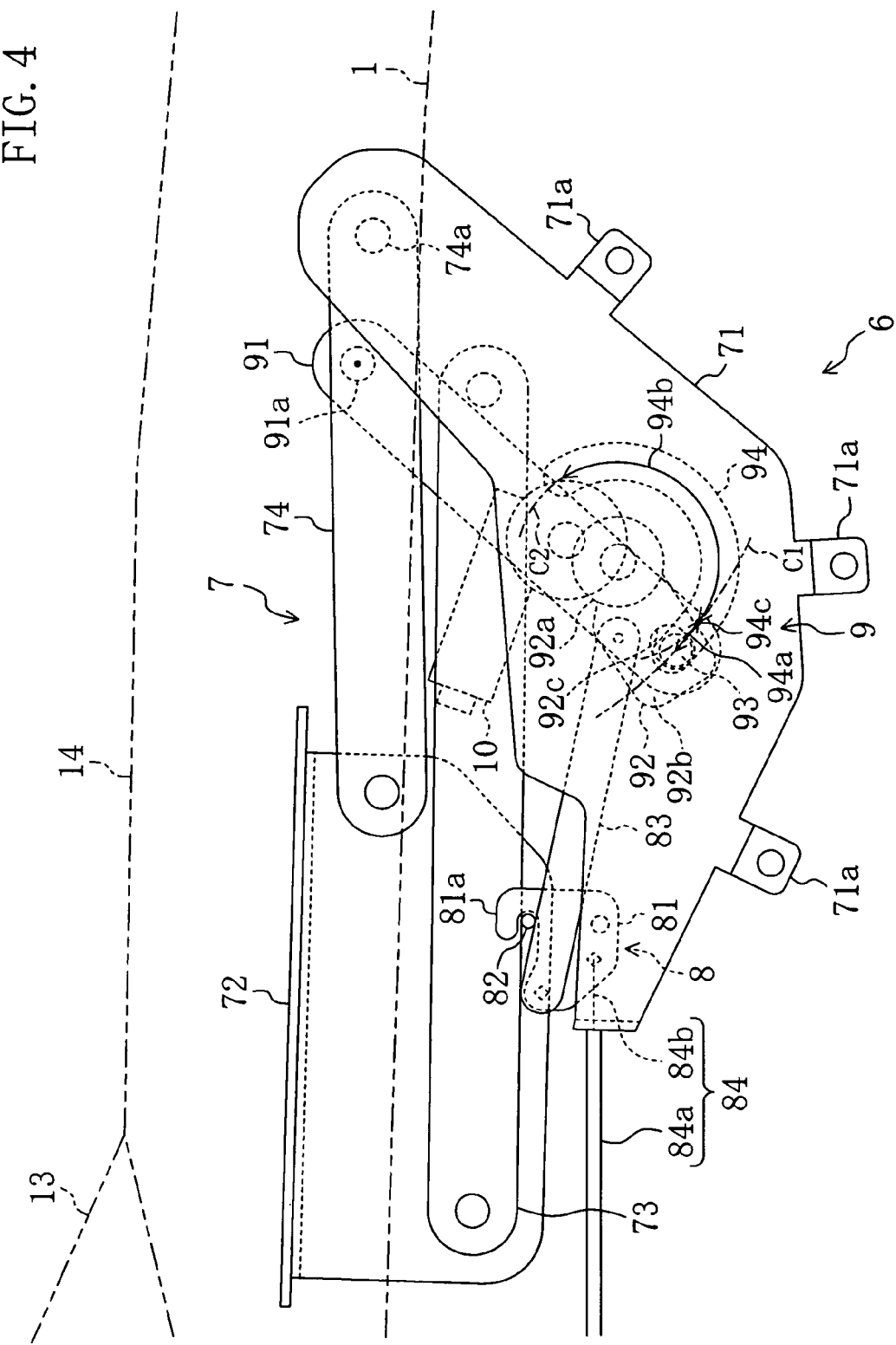
FIG. 4 is an outline side view showing a trunk lid opening/closing device when the trunk lid is locked in fully closed state.
Figure 5:
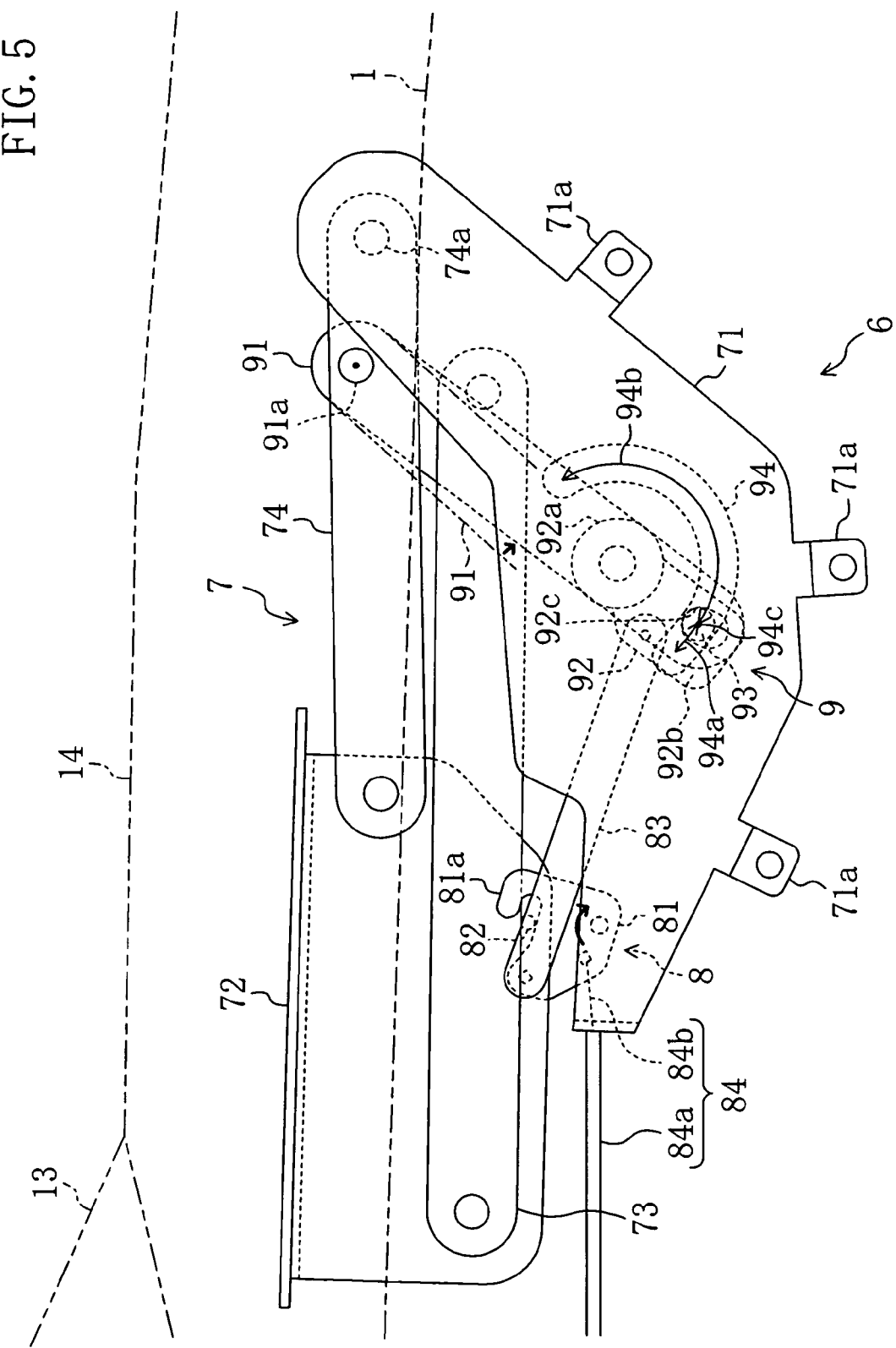
FIG. 5 is an outline side view showing the trunk lid opening/closing device when the trunk lid is lock released in fully closed state.

Said non-transmitting guide portion 94a is formed between one end at front lower side and the switching point 94c, and forms an arc C1 (shown in FIG. 4 only) which is drawn around the connection portion 91a in the fully closed state of trunk lid 14, to which the driving link 91 and the rear connecting link 74 are connected, and passes the connecting pin 93. In other words, when the connecting pin 93 is guided along the non-transmitting guide portion 94a, the driving link 91 simply rotates about the connection portion 91a as shown in FIGS. 4, 5, while the connection portion 91a is not displaced. As a result, the rear connecting link 74 does not move and the trunk lid 14 remains motionless in fully closed state. That is, the transmitting mechanism 9 is in non-transmitting state where driving force of the electric motor 10 is not transmitted to the link mechanism 7 while the connecting pin 93 is guided along the non-transmitting guide portion 94a.

Figure 6:
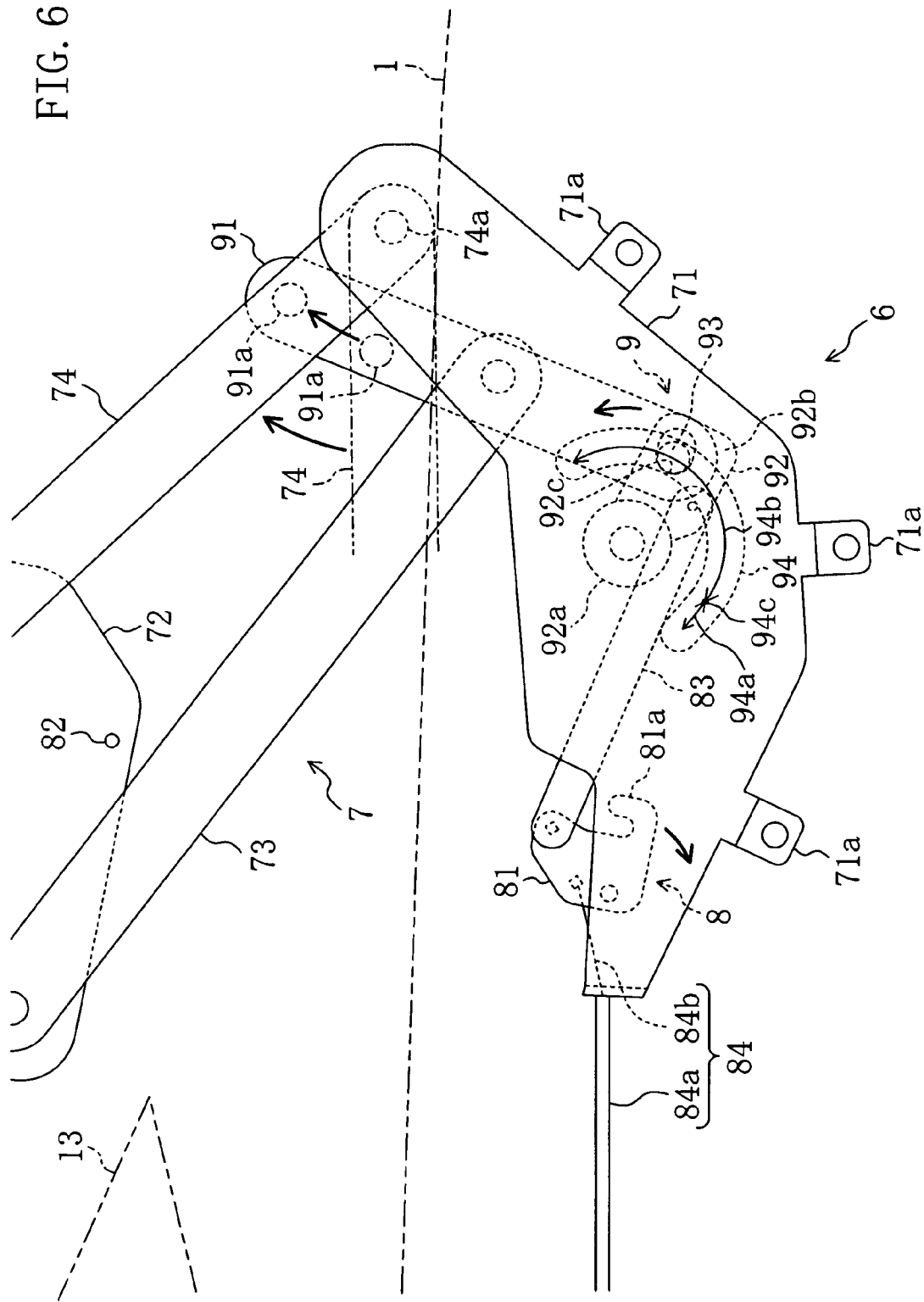
FIG. 6 is an outline side view showing the trunk lid opening/closing device when the trunk lid is performing opening/closing operation.

Said transmitting guide portion 94b is formed between the switching point 94c and other end at rear upper side, and has a profile of arc C2 (shown in FIG. 4 only) passing on the connecting pin 93 while rotation center of the sector gear 92 is centered. In other words, when the connecting pin 93 is guided along the transmitting guide portion 94b, the driving link 91 moves so as to displace the connection portion 91a of the driving link 91 and the rear connecting link 74 as shown in FIG. 6, and causes the rear connecting link 74 to rotate around a vehicle side end 74a. As a result, the trunk lid 14 performs opening/closing operation by the link mechanism 7 (see FIGS. 1 to 3). That is, the transmitting mechanism 9 is in transmitting state for transmitting driving force of the electric motor 10 to the link mechanism 7 while guiding the connecting pin 93 along the transmitting guide portion 94b.

Said locking mechanism 8 includes, as shown in FIG. 4, a hook 81 rotatably provided to said base bracket 71, an engaging pin 82 provided to said lid side bracket 72 and engages with the hook 81, and the lock transmitting link 83 for transmitting driving force of the electric motor 10 to the hook 81, and holds the trunk lid 14 in fully closed state by engaging the hook 81 with the engaging pin 82 when the trunk lid 14 is in fully closed state.

A hook portion 81a engaging with said engaging pin 82 is formed to said hook 81.

One end of said lock transmitting link 83 is rotatably connected to the connection portion 92b of said sector gear 92 and other end is rotatably connected to said hook 81 to transmit rotating motion of the sector gear 92 to the hook 81. The lock transmitting link 83 causes the hook 81 to rotate in the direction engaging with the engaging pin 82 (counterclockwise in FIG. 4) when the sector gear 92 drives the connecting pin 93 from switching point 94c to one end side direction along non-transmitting guide portion 94a of the guide portion 94 (clockwise in FIG. 4), and causes the hook 81 to rotate in the direction disengaging from the engaging pin 82 (clockwise in FIG. 4) when the sector gear 92 drives the connecting pin 93 from one end side to the switching point 94c direction along non-transmitting guide portion 94a of the guided portion 94 (counterclockwise in FIG. 4). Meanwhile, when the sector gear 92 guides the connecting pin 93 along the transmitting guide portion 94b of the guide portion 94, the hook 81 rotates in accordance with rotation of the sector gear 92 regardless of engagement of the engaging pin 82.

Further, to the hook 81 is provided an input end of an inner cable 84b of an input cable 84 which will be dealt with later.

Operations of the trunk lid 14 and the locking mechanism 8 driven by the trunk lid opening/closing device 6 thus composed will be explained hereafter.

First, when the trunk lid 14 is in fully closed state, the connecting pin 93 is, as shown in FIG. 4, located at one end of front lower side of the non-transmitting guide portion 94a of the guide portion 94. Since one end of the non-transmitting guide portion 94a side of the guide portion 94 is located at farthest position from center of rotation of the sector gear 92 in the guide portion 94, the connecting pin 93 is located at outer end of the fitting hole 92c.

In the meantime, the hook portion 81a of the hook 81 is engaged with the engaging pin 82 of the lid side bracket 72, thereby holding the trunk lid 14 in fully closed state.

When the sector gear 92 is turned counterclockwise by driving the electric motor 10 from this state, as shown in FIG. 5, the connecting pin 93 moves the non-transmitting guide portion 94a of the guide portion 94 from one end side to the switching point 94c side in accordance with rotation of the sector gear 92. Since this non-transmitting guide portion 94a has arc C1 profile around the connection portion 91a of the driving link 91 and the rear connecting link 74 when the trunk lid 14 is fully closed, the driving link 91 simply rotates about the connection portion 91a as long as the connecting pin 93 is being guided to the non-transmitting guide portion 94a. In other words, since the connection portion 91a does not displace, the rear connecting link 74 does not move, and the trunk lid 14 remains motionless in fully closed state. Further, since a distance between the non-transmitting guide portion 94a and rotation center of the sector gear 92 becomes shorter as it comes closer to the switching point 94c, the connecting pin 93 moves relatively in the fitting hole 92c from outer end side to inner end side as the connecting pin 93 moves along the non-transmitting guide portion 94a toward the transmitting guide portion 94b. When the connecting pin 93 reaches the switching point 94c, the connecting pin 93 will be located at inner end of the fitting hole 92c.

In the meantime, the hook 81 starts rotation from a state where the hook portion 81a is engaged with the engaging pin 82 to disengaging direction, and when the connecting pin 93 comes to the position of the switching point 94c of the guide portion 94, engagement with the engaging pin 82 is completely released. That is, the locking mechanism 8 performs unlocking operation when the transmitting mechanism 9 is in non-transmitting state.

When the sector gear 92 is further driven counterclockwise by driving the electric motor 10, as shown in FIG. 6, the connecting pin 93 will be guided along the transmitting guide portion 94b of the guide portion 94. Then, the connecting pin 93 moves being deviated from the arc C1 profile around said connection portion 91a, and therefore, the driving link 91 not only rotates about the connection portion 91a, but also moves to displace the connection portion 91a upwardly. As a result, the rear connecting link 74 rotates about the vehicle side end 74a and accordingly, the trunk lid 14 starts opening. On this occasion, the trunk lid 14 is able to perform opening/closing operation since the locking mechanism 8 is in unlocked state.

Meanwhile, engagement of the hook 81 with the engaging pin 82 is already released and it further rotates in the engagement releasing direction in accordance with rotation of the sector gear 92 regardless of engagement with the engaging pin 82.

Figure 2:
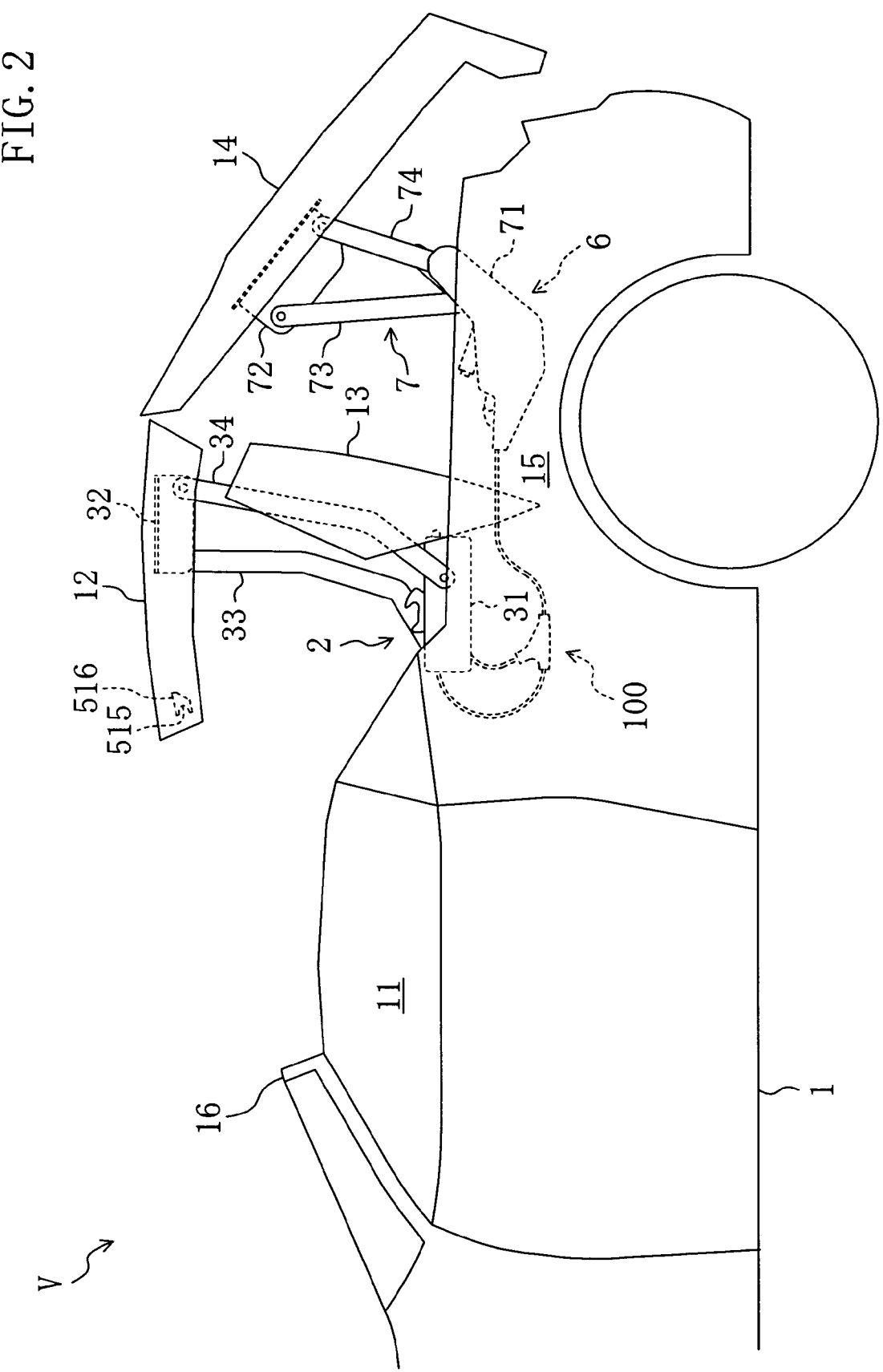
FIG. 2 is an outline side view showing a vehicle when the roof panel and trunk lid are performing opening/closing operation.
Figure 7:
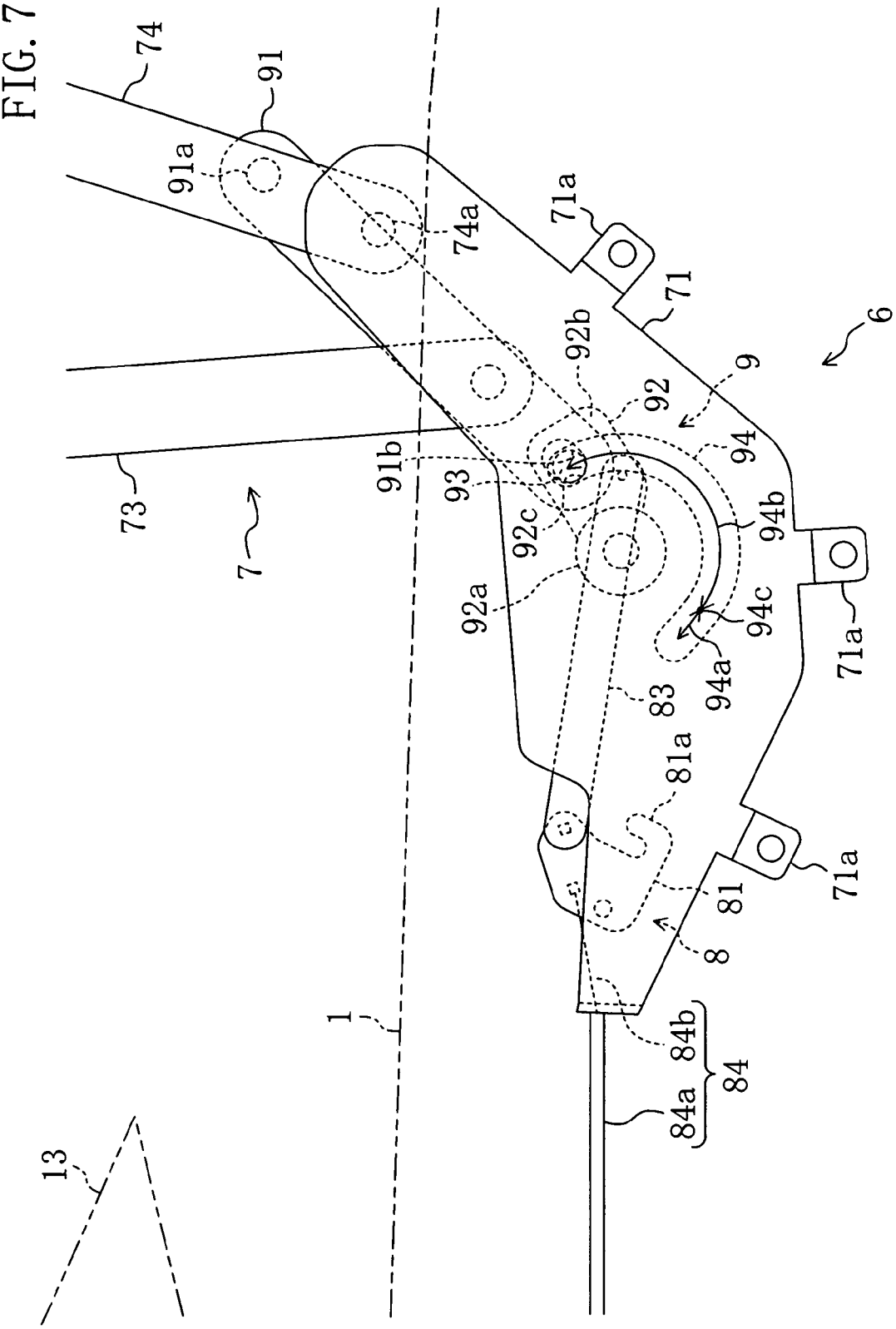
FIG. 7 is an outline side view showing the trunk lid opening/closing device when the trunk lid is in fully opened state.

When the connecting pin 93 finally moves to other end of rear upper side in the transmitting guide portion 94b of the guide portion 94 as shown in FIG. 7, the trunk lid 14 is brought into fully opened state (see FIG. 2).

Contrary, when the trunk lid 14 is brought from fully opened state to fully closed state, the operation from fully closed state to fully opened state as mentioned above is reversed.

First, the electric motor 10 is driven in the reverse direction (clockwise in the figure) of the direction when the trunk lid 14 is brought into fully opened state. The connecting pin 93 then moves on the transmitting guide portion 94b from other end side to switching point 94c side. The driving link 91 displaces the connection portion 91a in accordance with movement of the connecting pin 93, and rotates the rear connecting link 74 about the vehicle side end 74a in the direction to close the trunk lid 14. As a result, the trunk lid 14 starts closing.

When the connecting pin 93 arrives at the switching point 94c of the guide portion 94, the trunk lid 14 is in fully closed state where the trunk room 15 is fully closed (see FIG. 5).

After that, when the connecting pin 93 passes the switching point 94c and moves along the non-transmitting guide portion 94a from switching point 94c side to one end side, i.e., when the transmitting mechanism 9 is in non-transmitting state, the hook portion 81a of said hook 81 starts engagement with the engaging pin 82. When the connecting pin 93 reach one end of the non-transmitting guide portion 94a, the hook portion 81a of said hook 81 is fully engaged with the engaging pin 82 to become locked state. As mentioned above, the driving link 91 simply rotates about the connection portion 91a as long as the connecting pin 93 is moving along the non-transmitting guide portion 94a and the connection portion 91a is not displaced, and therefore, the trunk lid 14 remains motionless in fully closed state. That is, the locking mechanism 8 performs locking operation while the transmitting mechanism 9 is in non-transmitting state.

In this way, when the connecting pin 93 is moved along the non-transmitting guide portion 94a, the trunk lid opening/closing device 6 drives the locking mechanism 8 while the trunk lid 14 remains motionless to cause locking or unlocking operation. When the connecting pin 93 is moved along the transmitting guide portion 94b, it causes the trunk lid 14 to perform opening/closing operation.

<Roof Panel Opening/Closing Device>

Next, the roof panel opening/closing device 2 will be explained. The roof panel opening/closing device 2 is provided at both right and left side with respect to the roof panel 12 and the back window panel 13 and their configuration is identical, and therefore, explanation will be given for the roof panel opening/closing device 2 at the left referring to FIG. 9 to FIG. 15.

Figure 9:
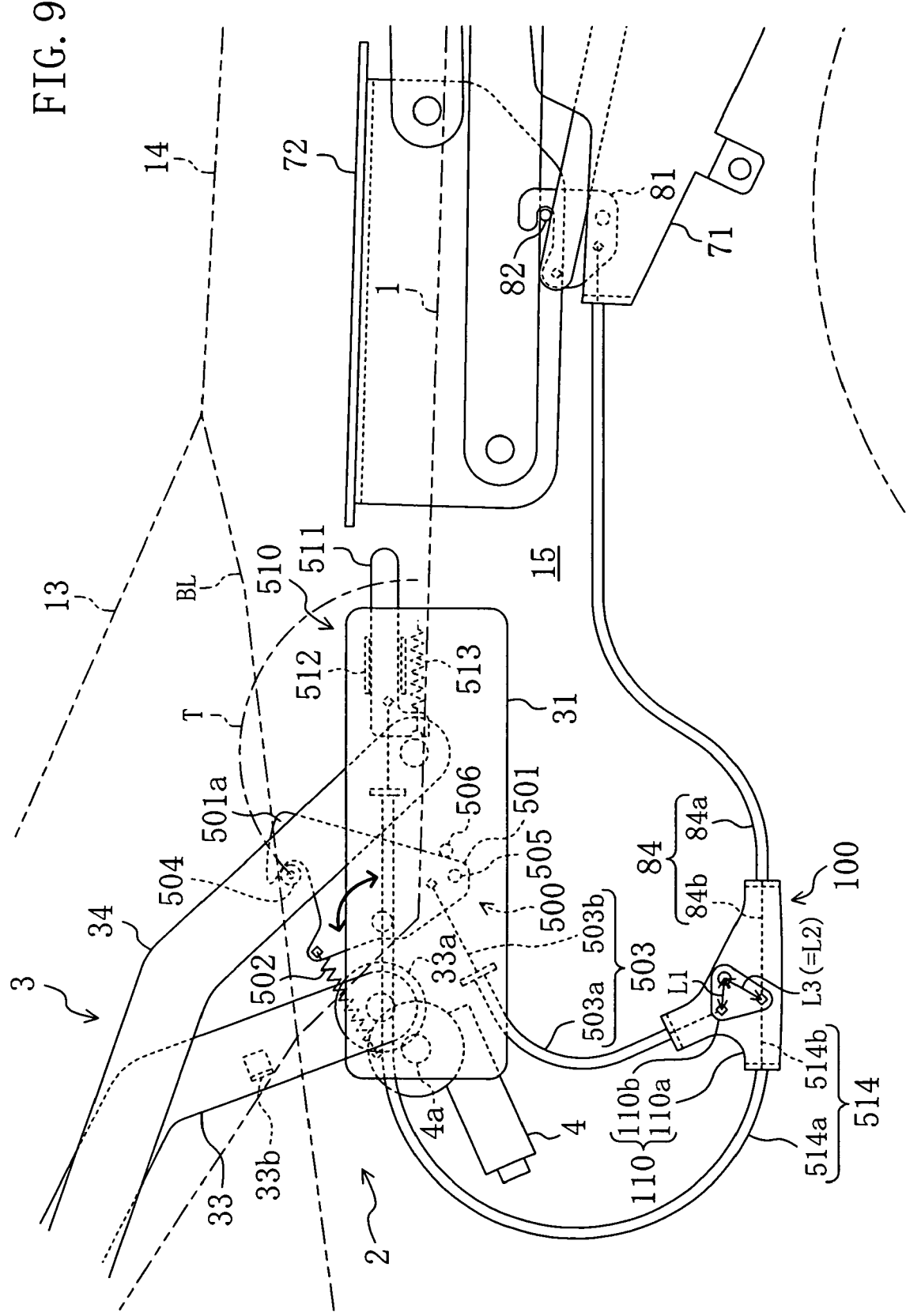
FIG. 9 is an outline side view showing the roof panel opening/closing device when the roof panel is locked in fully closed state.

The roof panel opening/closing device 2 includes, as shown in FIG. 9, the link mechanism 3 for connecting the roof panel 12, the back window panel 13, and vehicle body 1 (see FIG. 1), the electric motor 4 (shown in FIG. 9 only) for driving the link mechanism 3, a link restricting mechanism 500 for restricting the link mechanism 3 when the roof panel 12 and the back window panel 13 are in fully closed state, and a stored state locking mechanism 510 for holding the roof panel 12 when the roof panel 12 and the back window panel 13 are in stored state. The roof panel opening/closing device 2 causes the roof panel 12 and the back window panel 13 to perform opening/closing operation between fully closed state and stored state, restricts the link mechanism 3 in the fully closed state, and at the same time, holds the roof panel 12 in the stored state.

A sealing material (not shown) is provided at periphery of said roof panel 12 and the back window panel 13 in order to maintain air tightness of the vehicle cabin space 11 in fully closed state.

Said link mechanism 3 includes, as shown in FIGS. 1 to 3, a base bracket 31 provided to the vehicle body 1, a panel side bracket 32 provided to the roof panel 12, and the front connecting link 33 and the rear connecting link 34 for connecting the base bracket 31 and the panel side bracket 32.

A panel side end of said front connecting link 33 is rotatably connected to the panel side bracket 32 and a vehicle body side end of said front connecting link 33 is rotatably connected to the base bracket 31. Further, a panel side end of said rear connecting link 34 is rotatably connected to the panel side bracket 32 and a vehicle body side end of said rear connecting link 34 is rotatably connected to the base bracket 31 at backward position than the front connecting link member 33. The back window panel 13 is provided to the rear connecting link 34.

In this way, the base bracket 31, the panel side bracket 32, the front connecting link 33, and the rear connecting link 34 constitute so-called four-jointed link mechanism.

Said electric motor 14 is, as shown in FIG. 9, provided to vehicle body side end of the front connecting link 33. Specifically, a reduction gear 33a is provided to the vehicle body side end of the front connecting link 33, and the electric motor 4 is provided to said base bracket 31 in such that an output gear 4a provided to the output shaft thereof mates with the reduction gear 33a. In this way, driving force of the electric motor 4 is reduced and transmitted to the front connecting link 33 to rotate the front connecting link 33 about vehicle body side end thereof. Thus the link mechanism 3 is driven to perform opening/closing operation of the roof panel 12 and the back window panel 13.

The following description explains opening/closing operation of the roof panel 12 and back window panel 13 (hereafter also referred to as roof panel 12 and the like). Since the roof panel 12 and the like are opened and closed being interlocked with opening/closing operation of the trunk lid 14, interlocking with the trunk lid 14 is also explained.

First, in fully closed state, as shown in FIG. 1, the front connecting link 33 and the rear connecting link 34 are inclined forward being overlapped each other in the side elevation, and the roof panel 12 and the like are in fully closed state where the vehicle cabin space 11 is closed. In this case, the roof panel 12 is held by a locking mechanism (not shown) with respect to a front header 16 while front edge portion is in contact with the front header 16. Further, rear edge portion of the roof panel 12 and front edge portion of the back window panel 13 are in contact via the sealing member.

In this case, the trunk lid 14 is also in fully closed state.

When said electric motor 4 is driven from this state, as shown in FIG. 2, the front connecting link 33 starts backward rotation, the roof panel 12 and the like starts backward rotation in accordance with this movement and open the vehicle cabin space 11. Since the roof panel 12 is mounted to the panel side bracket 32 and the back window panel 13 is mounted to the rear connecting link 34, as the panel side bracket 32 and the rear connecting link 34 are folded by rotation of the link mechanism 3, the back window panel 13 is being folded with respect to the roof panel 12.

On this occasion, the trunk lid 14 performs opening/closing in accordance with the movements of the roof panel 12 and the back window panel 13. In particular, as shown in FIG. 2, in order to avoid interference with opening/closing operation of the roof panel 12 and the like, when the roof panel 12 and the like move up to a position, where the roof panel 12 and the like are overlapped on opening/closing track of the trunk lid 14, the trunk lid 14 is in opened state up to a position where it does not interfere with opening/closing track of the roof panel 12 and the like.

Finally, as shown in FIG. 3, the front connecting link 33 and the rear connecting link 34 are inclined backward being overlapped each other in the side elevation, and are in the trunk room 15 while the roof panel 12 and the back window panel 13 are folded and overlapped up and down.

In this case, the trunk lid 14 is closed gradually following the roof panel 12 and the like being retracted into the trunk room 15, and when the roof panel 12 and the like are stored wholly in the trunk room 15, the trunk room 15 is brought into fully closed state.

In contrast, when it is brought from stored state to fully closed state, above-mentioned opening/closing operation from fully closed state to stored state is reversed.

First, when opening of the trunk lid 14 is started, the roof panel 12 and the like start opening/closing operation towards fully closed state from the trunk room 15 inside. In this case, the trunk lid 14 opens so as not to interfere with the roof panel 12 and the like performing opening/closing operation towards fully closed state.

When the roof panel 12 and the like arrive at a position where the roof panel 12 does not overlap the opening/closing track of the trunk lid 14, the trunk lid 14 starts closing. Meanwhile, the roof panel 12 and the like continue movement towards fully closed state.

Finally, the roof panel 12 and the like and the trunk lid 14 are borough into fully closed state nearly simultaneously.

Subsequently, a mechanism for holding the roof panel 12 and the like will be explained.

With the roof panel 12 and the back window panel 13 thus composed, a front edge portion of the roof panel 12 is held by a locking mechanism to the front header 16 in fully closed state. However, when the vehicle is traveling, there is a possibility that they are lifted by uplifting force due to aerodynamic force or vibration. Even in stored state, there is a possibility that the roof panel 12 and the like jounce in the trunk room 15 due to vibrations. Several mechanisms are then required to hold the roof panel 12 and the like appropriately. In the present embodiment, the link restricting mechanism 500 for restricting movements of the link mechanism 3 in the fully closed state and the stored state locking mechanism 510 for holding the roof panel 12 in stored state are provided.

<Link Restricting Mechanism>

First, the link restricting mechanism 500 will be explained. The link restricting mechanism 500 is provided to each of the roof panel opening/closing device 2 provided at both right and left and their configuration is identical, and therefore, explanation will be given for left side link restricting mechanism 500.

The link restricting mechanism 500 is adapted to restrict movements of the link mechanism 3 when the roof panel 12 is in fully closed state and, as shown in FIG. 9, and includes a hook member 501 rotatably provided with respect to the base bracket 31, a biasing spring 502 for biasing the hook member 501 from rear to front on upper side (counterclockwise in the figure, hereafter referred to as engagement direction), a first driving cable 503 for rotating the hook member 501 from front to rear on upper side against biasing force of the biasing spring 502 (clockwise in the figure, hereafter referred to as disengagement direction), and an engaging pin 504 provided to said rear connecting link 34 and engages with said hook member 501.

Since said engaging pin 504 is provided to said rear connecting link 34, it moves between fully closed position corresponding to the roof panel 12 is fully closed (position shown in FIG. 9) and stored position corresponding to the roof panel 12 is stored (position shown in FIGS. 14, 15) while drawing an arc-shaped moving track T, together with the rear connecting link 34 rotating when the roof panel 12 performs opening/closing operation.

To said hook member 501 is formed a hook portion 501a in hook shape, and an inner periphery 501b of the hook portion 501a (see FIGS. 10, 11) engages with the engaging pin 504 when the roof panel 12 is in fully closed state. To the hook member 501 is provided a contacting pin 505 contacting with a contacting bracket 33b provided to the front connecting link 33 when the roof panel 12 performs opening/closing operation so as to be brought into stored state, which will be explained in detail later.

The hook member 501 thus composed is rotated in engagement direction by biasing force of the biasing spring 502 by releasing the driving of said first driving cable 503 (non-driving), and the hook portion 501a is caused to engage with the engaging pin 504 when the roof panel 12 is in fully closed state. Meanwhile, engagement of the hook portion 501a and the engaging pin 504 is disengaged by rotating the hook member 501 in disengaging direction against biasing force of the biasing spring 502 by driving of the first driving cable 503.

Engagement of the hook member 501 and the engaging pin 504 thus obtained restricts the rear connecting link 34 with respect to the vehicle body 1, and the roof panel 12 is held in fully closed state by this configuration.

Figure 10:
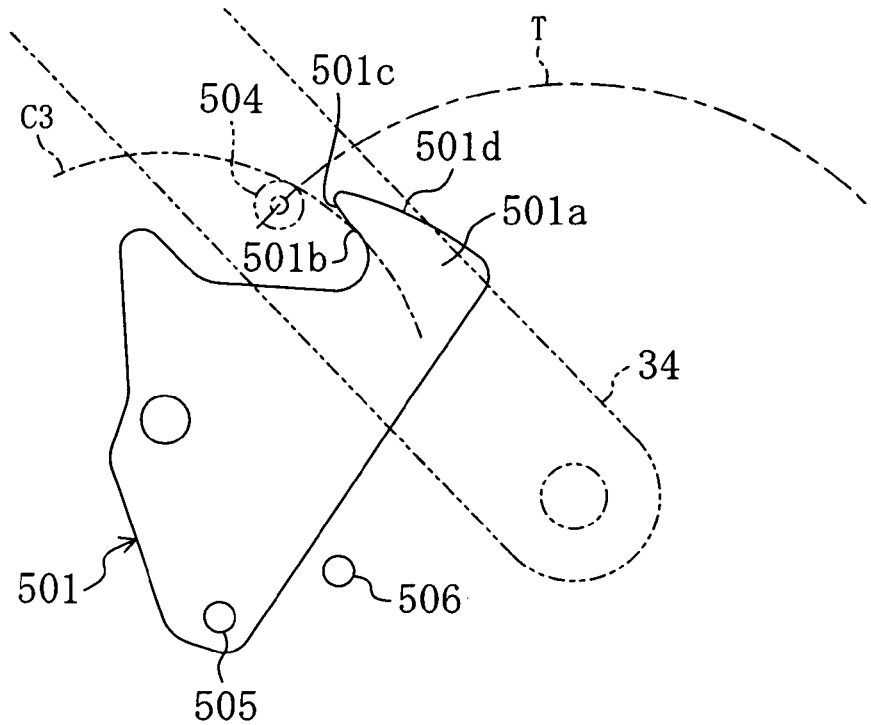
FIG. 10 is an outline side view for illustrating profile of inner periphery of the hook portion of the hook member.

The hook member 501 will be explained in detail hereafter. The inner periphery 501b of the hook portion 501a of said hook member 501 has such profile that, as shown in FIG. 10, a forefront portion 501c is opened to outside of a circumference C3 with respect to the circumference C3 passing on the hook portion 501a about rotation center of the hook member 501. With this configuration, even if the position of the engaging pin 504 is slightly shifted from original fully closed position when the roof panel 12 is fully closed state due to error at mounting the engaging pin 504 to the rear connecting link 34 or error of engaging pin 504 itself, the forefront portion 501c of the hook portion 501a reliably contacts the engaging pin 504 when the hook member 501 rotates in engagement direction, and the engaging pin 504 can be reliably engaged with the inner periphery 501b of the hook portion 501a.

Figure 11:
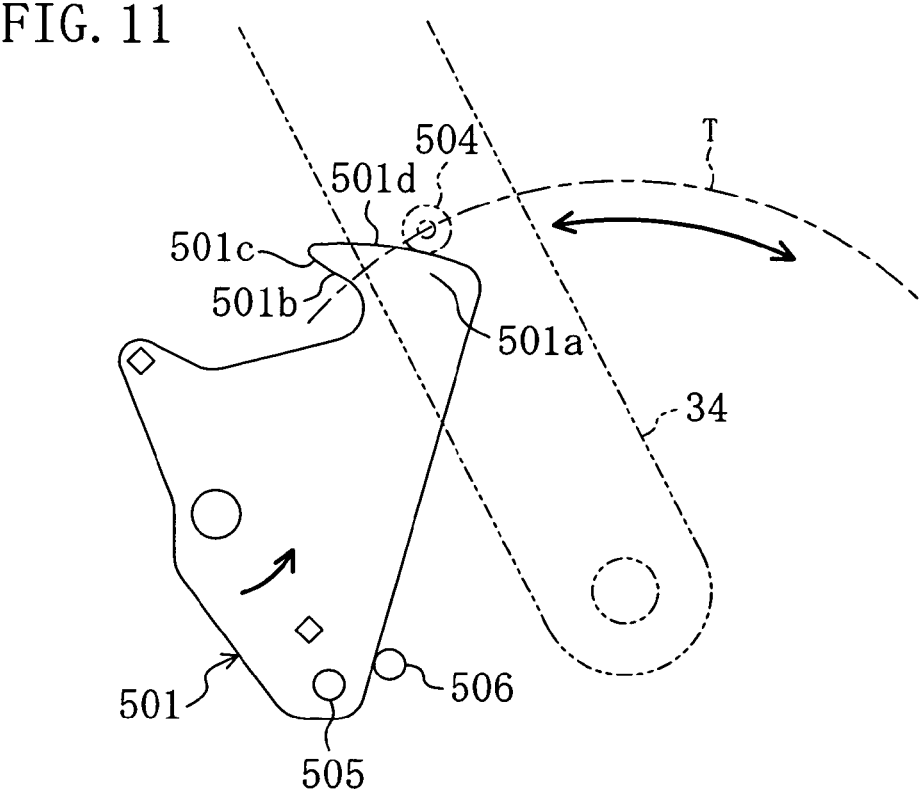
FIG. 11 is an outline side view for illustrating profile of outer periphery of the hook portion of the hook member.

Further, in an event the first driving cable 503 is disconnected by any chance, the hook member 501 rotates in engagement direction by biasing force of the biasing spring 502. However, as shown in FIG. 11, a stopper 506 contacting with the hook member 501 is provided so that hook member 501 stops at a stop position where an outer periphery 501d of the hook portion 501a is located on the movement track T of the engaging pin 504, and does not rotate further. The hook member 501 has inclined profile so that, when it stops at said stop position, the outer periphery 501d of the hook portion 501a is inclined with respect to the movement track T of the engaging pin 504. In other words, forefront of the outer periphery 501d of the hook portion 501a is located outside the arc-shaped movement track T and is inclined with respect to the movement track T so that base end side thereof is located inside the arc-shaped movement track T.

That is, when the first driving cable 503 is disconnected, biasing force of the biasing spring 502 acts to the hook member 501 in engagement direction. If this disconnection occurs while the roof panel 12 is in fully closed state, engagement of the hook member 501 and the engaging pin 504 cannot be released, but the roof panel 12 can be maintained in fully closed state. Meanwhile, when the disconnection occurred while the roof panel 12 is in other than fully closed state (e.g., at stored), the hook member 501 rotates up to said stop position by biasing force of the biasing spring 502. When the roof panel 12 performs opening/closing operation towards fully closed state in this state, the engaging pin 504 rotating together with the rear connecting link 34 contacts the outer periphery 501d of the hook portion 501a. Since, in this case, the outer periphery 501d is inclined as mentioned above, a pressing force when the engaging pin 504 moves towards fully closed position (see FIG. 8) acts on the hook member 501 so as to rotate the hook member 501 in releasing direction. As a result, the engaging pin 504 moves to fully closed position along the movement track T in accordance with opening/closing operation of the roof panel 12 towards fully closed state while causing the hook member 501 to rotate in releasing direction. In this case, the engaging pin 504 moves relatively on the outer periphery 501d of the hook portion 501a from base end to forefront, and when a portion where engaging pin 504 contacts the hook portion 501a is shifted from the outer periphery 501d to the forefront portion 501c of the inner periphery, the hook member 501 starts rotation in engagement direction by biasing force of the biasing spring 502 and engages with the engaging pin 504 when the engaging pin 504 has moved to the fully closed position.

In this way, even if the first driving cable 503 is disconnected, with such a configuration that the hook member 501 is caused to rotate in releasing direction by pressing force of the engaging pin 504 moving towards fully closed state when the roof panel 12 is brought into fully closed state to allow engagement of the hook member 501 and the engaging pin 504, such a situation that the engaging pin 504 interferes with the hook member 501 when the roof panel 12 performs opening/closing operation towards fully closed state, and movement to fully closed state is not possible, can be prevented, thereby reliably bringing the roof panel 12 into fully closed state.

<Stored State Locking Mechanism>

Next, the stored state locking mechanism 510 will be explained. The stored state locking mechanism 510 is provided to each of the roof panel opening/closing device 2 provided at both right and left and their configuration is identical, and therefore, explanation will be given for left side stored state locking mechanism 510.

The stored state locking mechanism 510 is adapted to hold the roof panel 12 in the trunk room 15 when the roof panel 12 is stored, and includes, as shown in FIG. 9, an engaging bar 511 mounted to a leading guide 512 provided to the base bracket 31 and is capable of directly moving in fore and aft directions, a biasing spring 513 for biasing the engaging bar 511 backward, a second driving cable 514 for moving the engaging bar 511 forward against biasing force of the biasing spring 513, and a counter engaging member 516 (see FIGS. 1 to 3, 14, 15) to which is formed a counter engaging hole 515 to which said engaging bar 511 is engaged.

Figure 14:
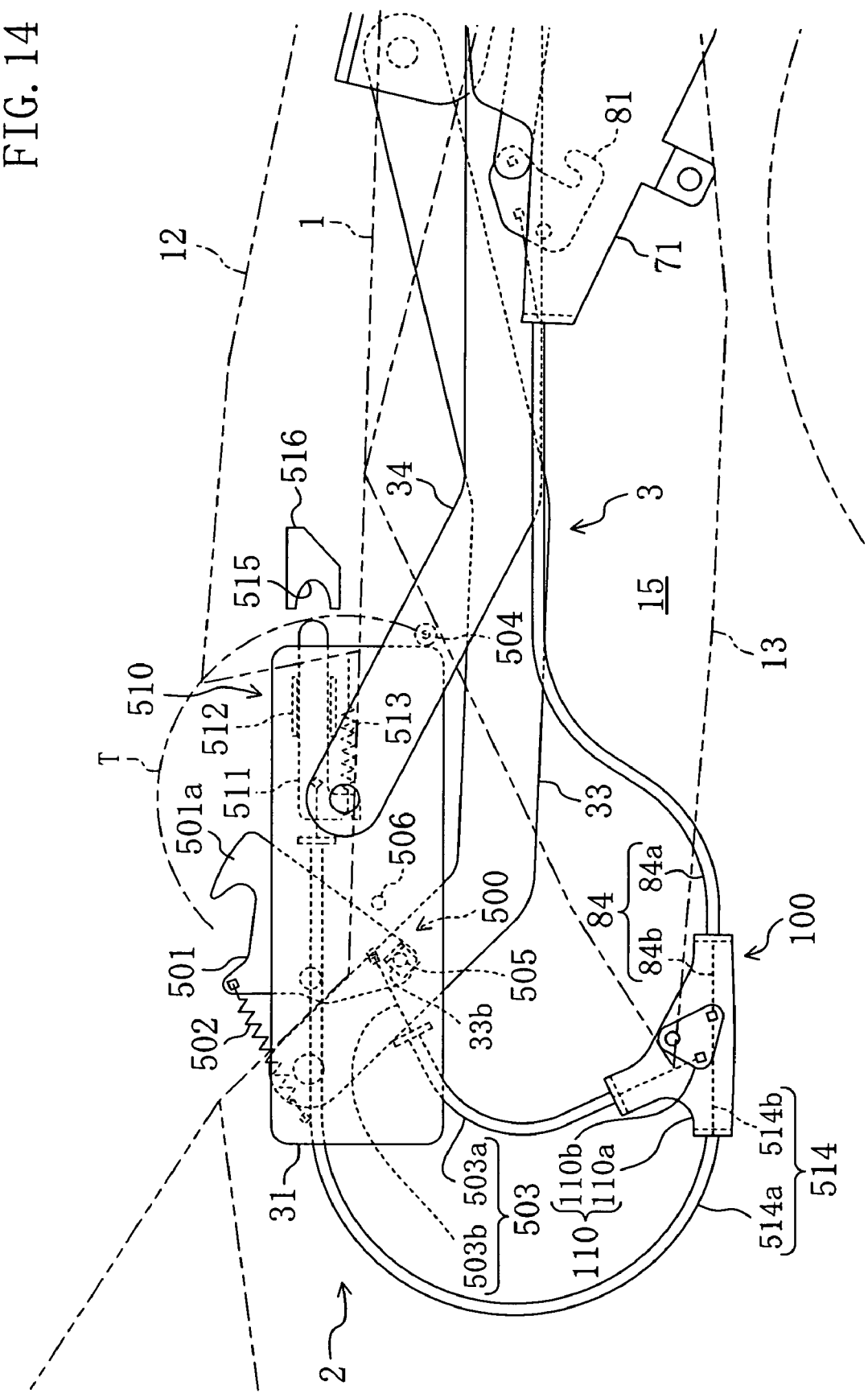
FIG. 14 is an outline side view showing the roof panel opening/closing device when the roof panel is in the trunk room.
Figure 15:
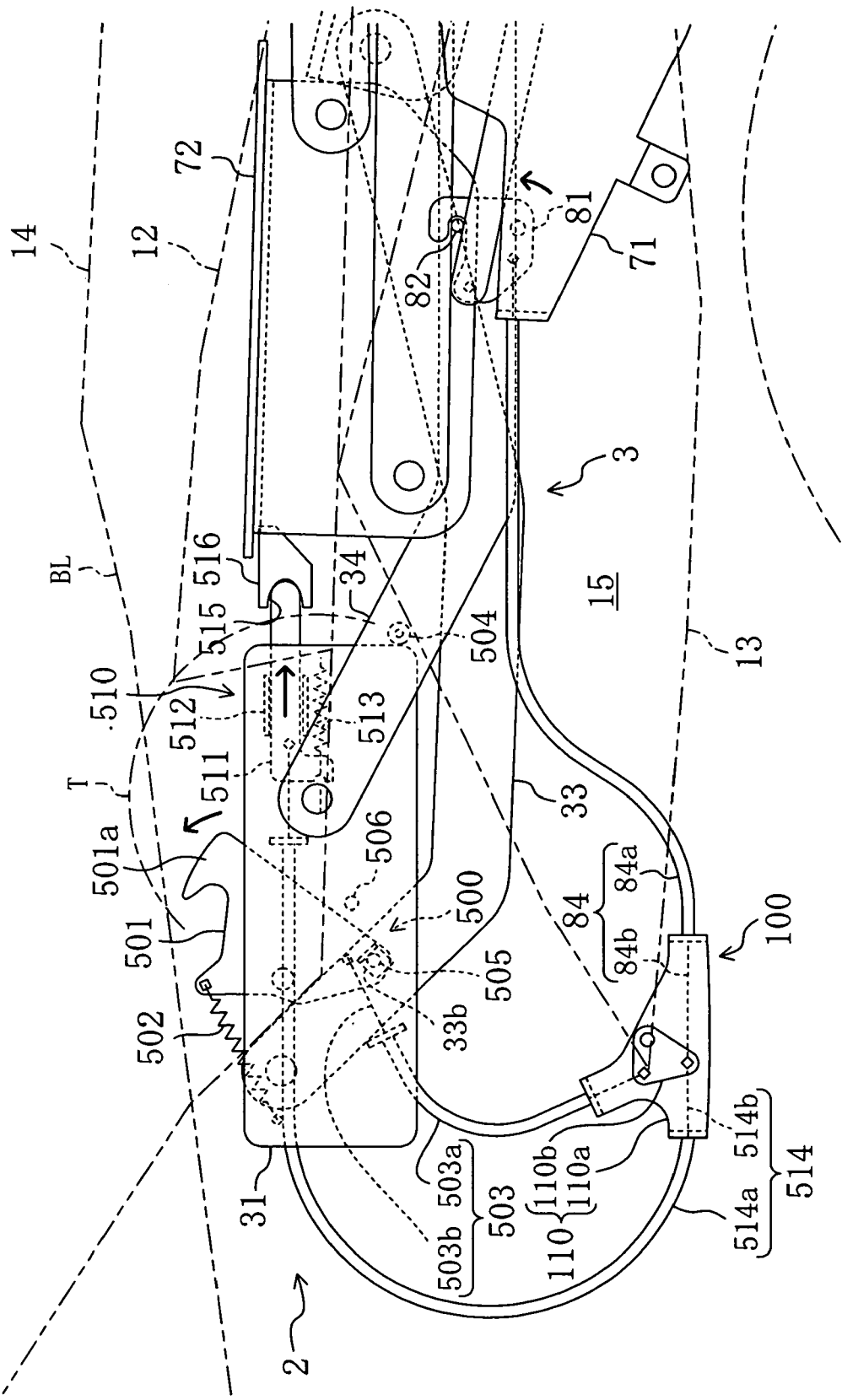
FIG. 15 is an outline side view showing the roof panel opening/closing device when the roof panel is locked in the trunk room and in the stored state.

Said engaging bar 511 is provided so that forefront thereof protrudes in the trunk room 15 and at a position to be inserted to the counter engaging hole 515 of the counter engaging member 516 of the roof panel 12 in stored state (see FIGS. 14, 15).

Specifically, the engaging bar 511 is moved backward (inside of trunk room 15) by biasing force of the biasing spring 513 by releasing the driving of the second driving cable 514 (non-driving) to cause it to engage with the counter engaging hole 515 of the counter engaging member 516 of the roof panel 12 now in fully closed state. In the meantime, the engaging bar 511 is moved forward (outside of trunk room 15) against biasing force of the biasing spring 513 by driving the second driving cable 514 to release engagement of the engaging bar 511 and the counter engaging hole 515.

<Branched Driving Cable>

Said link restricting mechanism 500 and the stored state locking mechanism 510 are driven by the electric motor 10 via a branched driving cable 100.

The branched driving cable 100 includes, as shown in FIG. 9, an input cable 84 connected to said hook 81, the first driving cable 503 for driving said link restricting mechanism 500, the second driving cable 514 for driving said stored state locking mechanism 510, and a connecting member 110 for connecting the input cable 84, the first driving cable 503 and the second driving cable 514.

Said connecting member 110 is constituted by a fixing bracket 110a mounted to the vehicle body 1 and a connecting plate 110b rotatably provided to the fixing bracket 110a.

Said input cable 84 is constituted by an outer cable 84a and an inner cable 84b slidably provided in the outer cable 84a. Input end of the outer cable 84a is provided to said base bracket 71 and input end of the inner cable 84b is provided to the hook 81. Meanwhile, output end of the outer cable 84a is provided to said fixing bracket 110a and an output end of the inner cable 84b is attached to part of said connecting plate 110b away from the rotation center thereof by a predetermined third distance L3.

Said first driving cable 503 is constituted by an outer cable 503a and an inner cable 503b slidably provided in the outer cable 503a. Input end of the outer cable 503a is provided to the fixing bracket 110a and input end of the inner cable 503b is attached to part of said connecting plate 110b away from the rotation center thereof by a predetermined first distance L1. Meanwhile, output end of the outer cable 503a is provided to the base bracket 31 and at the same time, output end of the inner cable 503b is provided to hook member 501.

Said second driving cable 514 is constituted by an outer cable 514a and an inner cable 514b slidably provided in the outer cable 514a. Input end of the outer cable 514a is provided to the fixing bracket 110a and at the same time, input end of the inner cable 514b is attached to part of said connecting plate 110b away from the rotation center thereof by a predetermined second distance L2. In the meantime, output end of the outer cable 514a is provided to the base bracket 31 and at the same time, output end of the inner cable 514b is provided to the engaging bar 511. In the present embodiment, the inner cable 84b of said input cable 84 and the inner cable 514b of the second driving cable 514 are provided at the same position with respect to the connecting plate 110b, and therefore, the second distance L2 and the third distance L3 are identical.

Said hook 81 is driven by the electric motor 10 via the lock transmitting link 83 (see FIG. 4). That is, the link restricting mechanism 500 and the stored state locking mechanism 510 being driven by the branched driving cable 100 whose input end is provided to the hook 81 are driven by the electric motor 10.

The following description explains operations of the link restricting mechanism 500 and the stored state locking mechanism 510 being interlocked with operations of the hook 81.

First, when the roof panel 12 is in fully closed state, as shown in FIGS. 4, 9, the hook 81 is in a state engaged with the engaging pin 82 and the hook member 501 is in a state engaged with the engaging pin 504. Although the engaging bar 511 is in a state being moved backward, it is not functioning as a locking mechanism since the roof panel 12 is in fully closed state.

Figure 12:
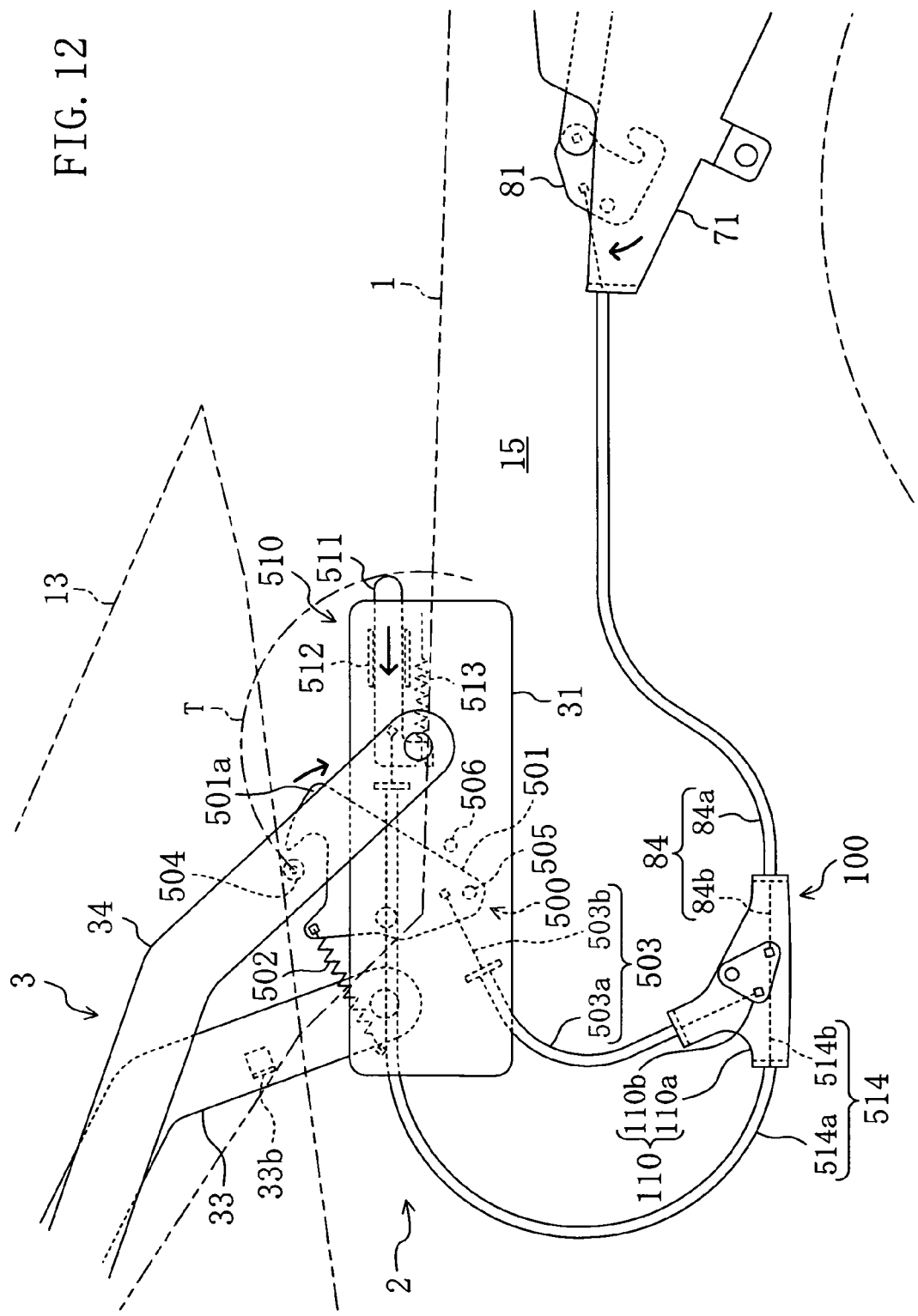
FIG. 12 is an outline side view showing the roof panel opening/closing device when the roof panel is lock released in fully closed state.
Figure 13:
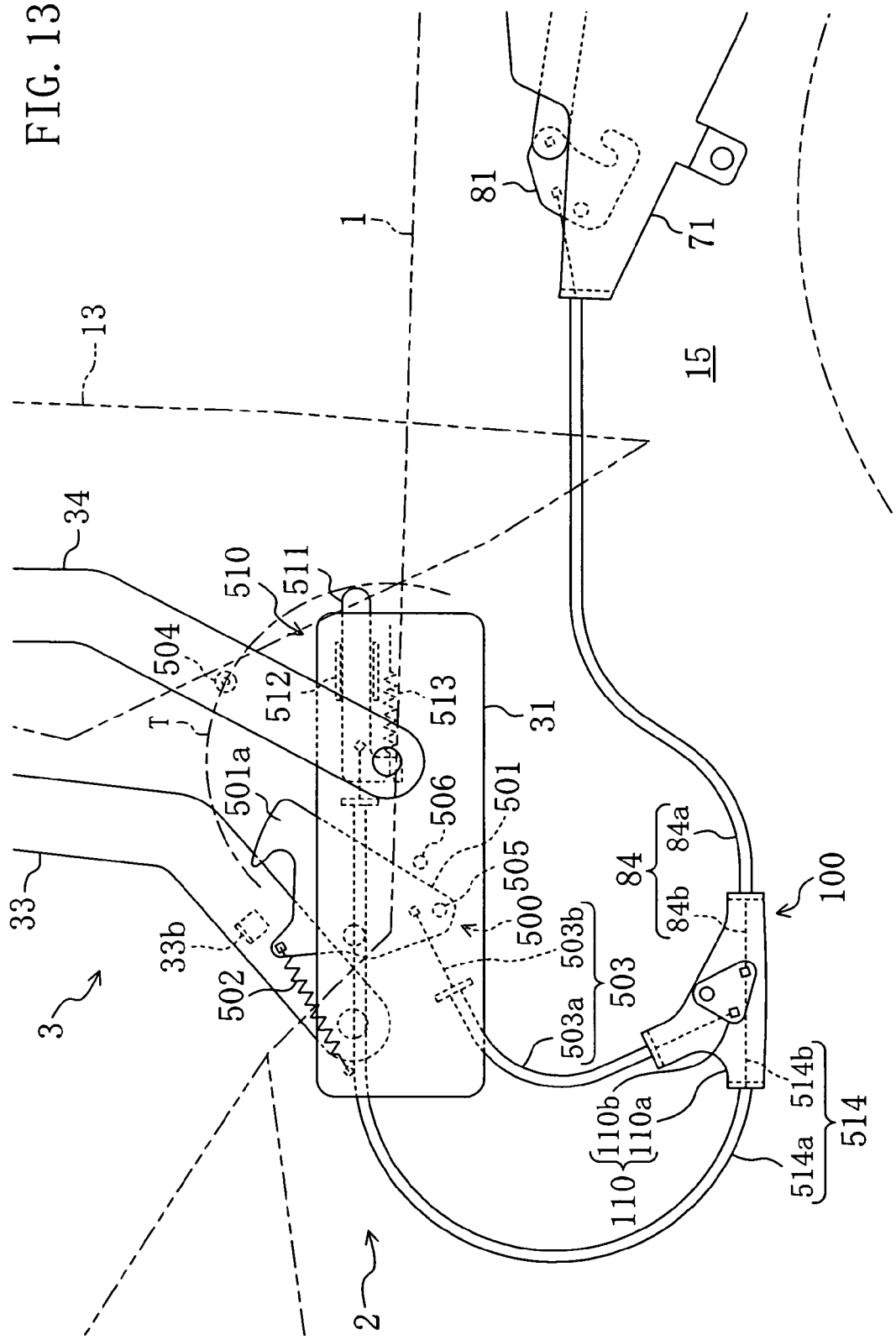
FIG. 13 is an outline side view showing the roof panel opening/closing device when the roof panel is performing opening/closing operation.

When the electric motor 10 is driven, from this state, in a direction for releasing engagement of the hook 81 and the engaging pin 82, as shown in FIG. 12, the inner cable 84b of the input cable 84 is being pulled in accordance with rotation of the hook 81. When the inner cable 84b is pulled, the connecting plate 110b connected to output end thereof rotates in one direction (counterclockwise in FIG. 8), and when the connecting plate 110b rotates in one direction, the inner cable 503b of the first driving cable 503 and the inner cable 514b of the second driving cable 514 are pulled. As a result, the first driving cable 503 causes the hook member 501 to rotate in releasing direction, thereby releasing the engagement of the hook member 501 and the engaging pin 504. Further, as mentioned above, although the stored state locking mechanism 510 does not function as the locking mechanism while the roof panel 12 is in closed state, the engaging bar 511 moves forward since the second driving cable 514 is pulled.

In this way, a pulling force accompanied by rotation of the hook 81 is transmitted to the link restricting mechanism 500 and the stored state locking mechanism 510 via the branched driving cable 100. Here, since input end of the inner cable 503b of the first driving cable 503 and input end of the inner cable 514b of the second driving cable 514 are attached to part of the connecting plate 110b away from rotation center thereof by the first distance L1 and the second distance L2, respectively, the pulling force being input from the input cable 84 is transmitted to the first driving cable 503 and the second driving cable 514 being distributed with a ratio of L1:L2. Further, from viewpoint of stroke volume, since input end of the inner cable 503b of the first driving cable 503, input end of the inner cable 514b of the second driving cable 514, and output end of the inner cable 84b of the input cable 84 are attached to part of the connecting plate 110b away from rotation center thereof by the first distance L1, second distance L2, and third distance L3, respectively, stroke volume input to the input cable 84 (i.e., amount the inner cable 84b is pulled) is multiplied (L1/L3) times and transmitted to the first driving cable 503, and multiplied (L2/L3) times and transmitted to the second driving cable 514.

In this way, when restriction of the link mechanism 3 by the link restricting mechanism 500 is released, as shown in FIG.

13, the electric motor 4 is driven, and the front connecting link 33 and the rear connecting link 34 start backward rotation.

While the roof panel 12 performs opening/closing operation from fully closed state to stored state, i.e., while the trunk lid 14 is once brought from fully closed state to opened state and brought again to fully closed state, the hook 81 remains being rotated in the direction of releasing the engagement with the engaging pin 82, and therefore, the inner cable 84b of the input cable 84 remains in a state being pulled. Accordingly, the hook member 501 is held being rotated in the direction of releasing and at the same time, the engaging bar 511 is also held being moved forward.

In due course of time, as shown in FIG. 14, the roof panel 12 and the back window panel 13 are folded one above the other and are stored in the trunk room 15. After that, when the trunk lid 14 is brought into fully closed state, said transmitting mechanism 9 is brought into non-transmitting state, the locking mechanism 8 performs locking operation to lock the trunk lid 14. That is, the hook 81 rotates so as to be engaged with the engaging pin 82. In this way, the pulling force acting on the inner cable 84b of the inner cable 84 is released and as a result, as shown in FIG. 15, the hook member 501 rotates in engagement direction by biasing force of the biasing spring 502 and at the same time, the engaging bar 511 moves backward by biasing force of the biasing spring 513.

On this occasion, the roof panel 12 is stored in the trunk room 15, and the counter engaging hole 515 of said counter engaging member 516 provided to front edge portion of the roof panel 12 is located at a position opposed to the engaging bar 511. In other words, when the engaging bar 511 moves backward by biasing force of the biasing spring 13, it engages with the counter engaging hole 515 to lock the roof panel 12 in stored state. That is, the stored state locking mechanism 510 functions as the locking mechanism.

In the meantime, while the roof panel 12 is stored, the link restricting mechanism 500 for holding the roof panel 12 in fully closed state does not need to function as the locking mechanism. Therefore, when the roof panel 12 performs opening/closing operation towards stored state, as shown in FIGS. 14, 15, the hook member 501 is held at a position lower than the belt line BL formed on upper periphery of the vehicle body 1 and upper periphery of the trunk lid 14 by that the hook member 501 is rotated backward (i.e., releasing direction) together with the front connecting link 33, while said contacting bracket 33b of the front connecting link 33 rotating backward contacts with the contacting pin 505 provided to the hook member 501.

When the first driving cable 503 rotates to engagement position in non-driving state, the hook member 501 is in a state protruded above the belt line BL as shown in FIG. 8. While the roof panel 12 is in fully closed state, the hook member 501 can not be viewed from outside the vehicle even if protruded upward from the belt line BL since it is hidden by the back window panel 13. However, while the roof panel 12 is in stored state, since the back window panel 13 is stored in the trunk room 15 together with the roof panel 12, if the hook member 501 is protruded above the belt line BL, it is viewed from outside the vehicle, thereby deteriorating beauty. Therefore, as mentioned above, while the roof panel 12 is in stored state, it is rotated to a position not protruding from the belt line BL, in releasing direction together with the front connecting link 33 rotating backwardly, to be held at a position hidden by the vehicle body 1 in the side elevation.

In this way, the roof panel 12 is held in fully closed state by the stored state locking mechanism 510 and at the same time, the trunk lid 14 is also held in fully closed state by the locking mechanism 8.

In the meantime, when the roof panel 12 performs opening/closing operation from stored state to fully closed state, the electric motor 10 is driven and, first, disengagement of the hook 81 and the engaging pin 82 is carried out. Since this operation results in pulling of the inner cable 84b of the inner cable 84, the hook member 501 is caused to rotate in releasing direction and at the same time, the engaging bar 511 is caused to move forward. As a result, engagement of the engaging bar 511 and counter engaging hole 515 is released. In this way, unlocking operation of the locking mechanism 8 for holding the trunk lid 14 and the same of the stored state locking mechanism 510 holding the roof panel 12 are carried out at the same time.

While the roof panel 12 performs opening/closing operation from stored state to fully closed state, i.e., while the trunk lid 14 is once brought from fully closed state to opened state and brought again to fully closed state, the hook 81 remains being rotated in the direction of releasing the engagement with the engaging pin 82, and therefore, the inner cable 84b of the input cable 84 remains in a state being pulled. Accordingly, the hook member 501 is held being rotated in the direction of releasing and at the same time, the engaging bar 511 is also held being moved forward.

In due course of time, when front edge portion of the roof panel 12 contacts with the front header 16 and the roof panel 12 is brought into fully closed state, the trunk lid 14 is also in the fully closed state, and the locking mechanism 8 performs locking operation for the trunk lid 14 in fully closed state. That is, the hook 81 rotates so as to be engaged with the engaging pin 82. The pulling force acting on the inner cable 84b of the input cable 84 is then released, and as a result, the hook member 501 rotates in engagement direction by biasing force of the biasing spring 502 and at the same time, the engaging bar 511 moves backward by biasing force of the biasing spring 513.

On this occasion, the roof panel 12 is in fully closed state and the engaging pin 504 provided to the rear connecting link 34 is in fully closed position capable of engaging with the hook member 501. That is, when the hook member 501 rotates in engagement direction by biasing force of the biasing spring 502, the hook portion 501a engages with the engaging pin 504, thereby restricting the link mechanism 3 for the roof panel 12 in fully closed state. In other words, the link restricting mechanism 500 functions as the locking mechanism.

In the meantime, since the roof panel 12 is brought into fully closed state and does not exist in the trunk room 15, the stored state locking mechanism 510 does not function as the locking mechanism while the engaging bar 511 simply moves backward.

In this way, the roof panel 12 is held in fully closed state by the link restricting mechanism 500 and the trunk lid 14 is also held in fully closed sate by the locking mechanism 8.

Therefore, according to said embodiment, the link restricting mechanism 500 and the stored state locking mechanism 510 can be driven by one input from the electric motor 10 via the hook 81. That is, the link restricting mechanism 500 is a locking mechanism required while the roof panel 12 is in fully closed state and the stored state locking mechanism is a locking mechanism required while the roof panel 12 is in stored state, and since fully closed state and stored state of the roof panel 12 do not occur at the same time, the link restricting mechanism 500 and the stored state locking mechanism 510 may function as a locking mechanism alternatively. Therefore, while the roof panel 12 is in fully closed state, only the link restricting mechanism 500 should be taken into account and be operated by the electric motor 10. While the roof panel 12 is in stored state, only the stored state locking mechanism 510 should be taken into account and be operated by the electric motor 10. In this way, since the link restricting mechanism 500 and the stored state locking mechanism 510 are designed to be driven by the branched driving cable 100 having one input cable 84 and two driving cables (i.e., first driving cable 503 and second driving cable 514), driving sources can be made common, thereby reducing the number of parts.

Further, since the link restricting mechanism 500 and the stored state locking mechanism 510 can be driven by one branched driving cable 100 instead of driving them by two driving cables, respectively, the number of driving cables can be reduced and at the same time, ease of assembly can be improved through reduction in the number of cables.

Further, since the link restricting mechanism 500 and the stored state locking mechanism 510 are driven by the hook 81, locking/unlocking of the roof panel 12 in fully closed state and stored state can be interlocked with locking and unlocking of the trunk lid 14. That is, the roof panel 12 in fully closed state or stored state can be unlocked when the trunk lid 14 is unlocked, and the roof panel 12 in fully closed state or stored state can be locked when the trunk lid 14 is locked. With this feature, each of operation timings of the roof panel 12 and the trunk lid 14 can be set with flexible manner in such that opening/closing operation of the trunk lid 14 and opening/closing operation of the roof panel 12 are started with nearly same timing, instead of starting opening/closing operation having waited for unlocking of either component. As a result, time required for operation of the roof panel 12 or the like from fully closed state to stored state and from stored state to fully closed state can be shortened.

Further, since the connecting plate 110b of the connecting member 100 is configured to be rotatable, output end on the inner cable 84b of an input cable 84, input end of the inner cable 503b of the first driving cable 503 and input end of the inner cable 514b of the second driving cable 514 are attached to the connecting plate 110b. Each of attached positions is located at a position away from rotation center of the connecting plate 110b by the first distance L1, second distance L2, and third distance L3, respectively. Therefore, the pulling force input to the input cable 84 can be distributed to drive the first and second driving cables 503 and 514, and the first driving cable 503 and the second driving cable 514 can be driven by increasing/decreasing stroke volume (amount of travel of the inner cable 84b as it is pulled). In other words, the first driving cable 503 and the second driving cable 514 can be driven while pulling force and stroke volume input to the input cable 84 are adjusted, by adjusting said first distance L1, second distance L2, and third distance L3.

Although in the above shown embodiment, the branched driving cable 100 drives the link restricting mechanism 500 and the stored state locking mechanism 510 by driving force of the hook 81, the present invention is not limited thereto. That is, by connecting two means to be driven functioning simultaneously, or two means to be driven which should function alternatively to output end of each of the first driving cable 503 and the second driving cable 514 of the branched driving cable 100, two means to be driven can be driven by one driving source, thereby reducing the number of parts.

INDUSTRIAL APPLICABILITY

As described hereinbefore, the present invention is useful for a system for opening/closing a roof panel, which is supported by a vehicle body via a link mechanism, and which is capable of opening, closing, moving between a fully closed state where a vehicle cabin space is closed and a closed state where the vehicle cabin space is opened and is stored in a storage room at rear side of the vehicle, for holding the roof panel between the fully closed state and the stored state, and branched driving cable to be used for the system.

The invention claimed is:

1. A branched driving cable, comprising:
an input cable driven by a pulling force;
a rotatable connecting member connected to an output end of the input cable;
a first output cable, an output end of which is connected to the rotatable connecting member while an input end of which is connected to a first member to be driven; and
a second output cable, an output end of which is connected to the rotatable connecting member and input end is connected to a second member to be driven.

2. The branched driving cable according to claim 1, wherein
said first output cable is connected to said rotatable connecting member at a position away from a rotation center of the rotatable connecting member for a predetermined first distance;
said second output cable is connected to said rotatable connecting member at a position away from the rotation center of the rotatable connecting member for a predetermined second distance; and
said input cable is connected to said rotatable connecting member at a position away from the rotation center of the rotatable connecting member for a predetermined third distance.

* * * * *

UNITED STATES PATENT AND TRADEMARK OFFICE
CERTIFICATE OF CORRECTION

| | |
|---|---|
| PATENT NO. | : 8,042,424 B2 |
| APPLICATION NO. | : 12/295159 |
| DATED | : October 25, 2011 |
| INVENTOR(S) | : Koji Sawahata et al. |

It is certified that error appears in the above-identified patent and that said Letters Patent is hereby corrected as shown below:

On the Cover Page, item (75) Inventors should read: Takaaki Motohashi, Hiroshima (JP)

item (87) PCT Pub. Date should read: October 11, 2007

Signed and Sealed this
Twenty-fourth Day of April, 2012

David J. Kappos
*Director of the United States Patent and Trademark Office*